(12) United States Patent
Bailey et al.

(10) Patent No.: US 11,981,805 B2
(45) Date of Patent: May 14, 2024

(54) FATIGUE RESISTANT AND FRACTURE RESISTANT HYDROGELS

(71) Applicant: Colorado State University Research Foundation, Fort Collins, CO (US)

(72) Inventors: Travis S. Bailey, Fort Collins, CO (US); Allee S. Klug, Loveland, CO (US)

(73) Assignee: COLORADO STATE UNIVERSITY RESEARCH FOUNDATION, Fort Collins, CO (US)

( * ) Notice: Subject to any disclaimer, the term of this patent is extended or adjusted under 35 U.S.C. 154(b) by 144 days.

(21) Appl. No.: 17/445,910

(22) Filed: Aug. 25, 2021

(65) Prior Publication Data
US 2022/0064431 A1    Mar. 3, 2022

Related U.S. Application Data

(60) Provisional application No. 63/070,059, filed on Aug. 25, 2020.

(51) Int. Cl.
*C08L 53/02* (2006.01)
*B01J 13/00* (2006.01)
*C08L 25/06* (2006.01)
*C08L 47/00* (2006.01)
*C08L 71/02* (2006.01)

(52) U.S. Cl.
CPC ........... *C08L 53/02* (2013.01); *B01J 13/0065* (2013.01); *C08L 25/06* (2013.01); *C08L 47/00* (2013.01); *C08L 71/02* (2013.01)

(58) Field of Classification Search
CPC .......... C08L 53/02; C08L 25/06; C08L 47/00; C08L 71/02; B01J 13/0065
See application file for complete search history.

(56) References Cited

FOREIGN PATENT DOCUMENTS

WO    WO-2018098023 A1 *  5/2018  .......... C08F 297/044

* cited by examiner

*Primary Examiner* — Angela C Scott
(74) *Attorney, Agent, or Firm* — Polsinelli PC

(57) ABSTRACT

The present disclosure relates to triblock and pentablock copolymers and methods of making thereof. Aspects of the disclosure further relate to block copolymer hydrogels that exhibit both fatigue resistance and fracture resistance with superior rates of recovery.

20 Claims, 20 Drawing Sheets

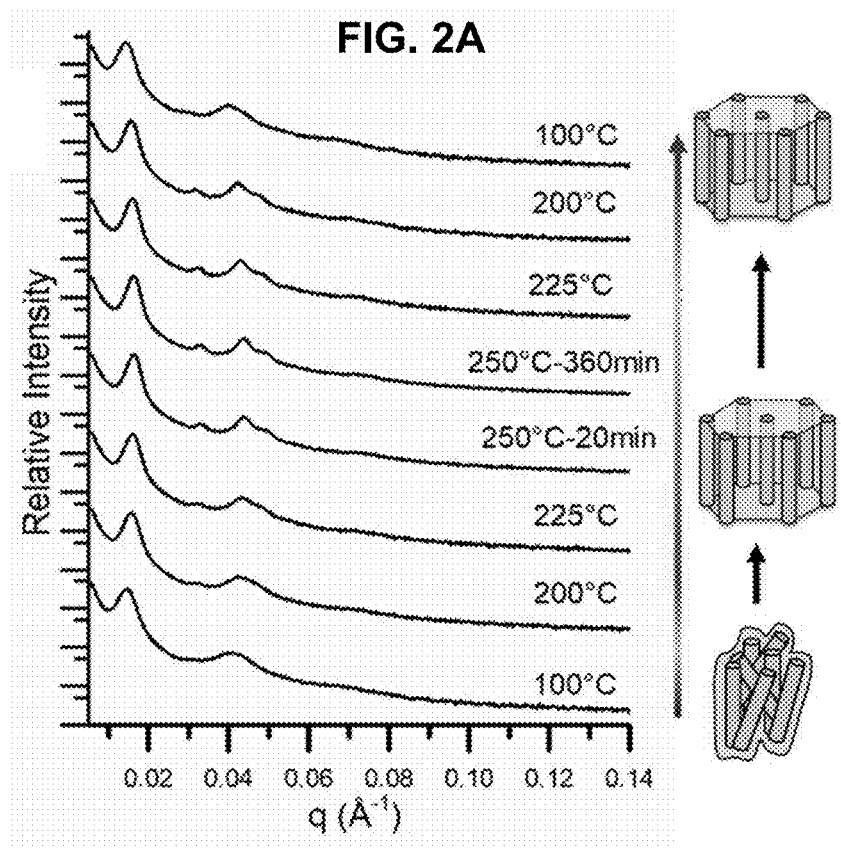
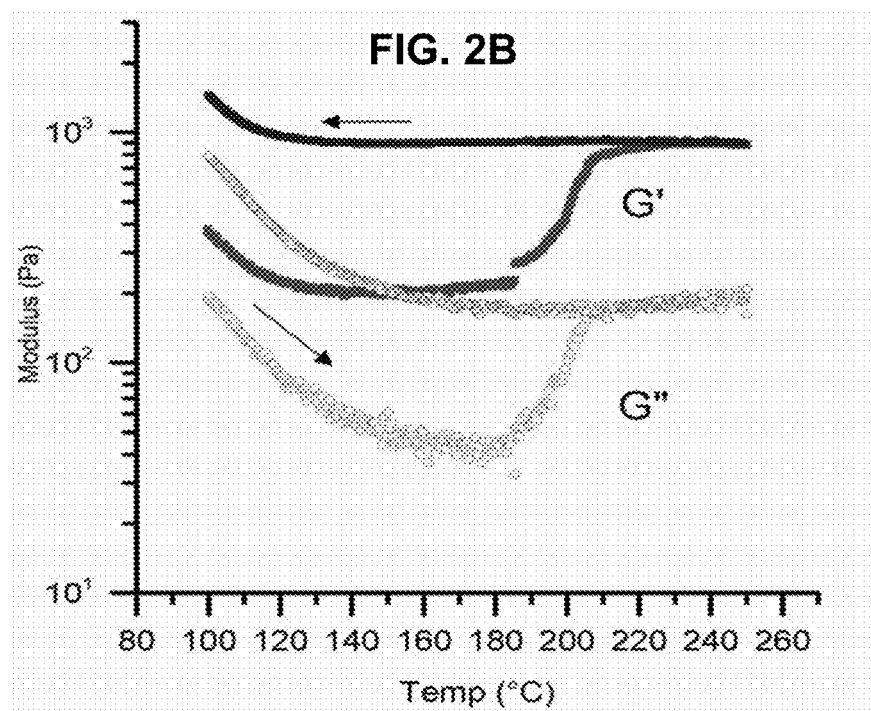

SIO-3a
150°C

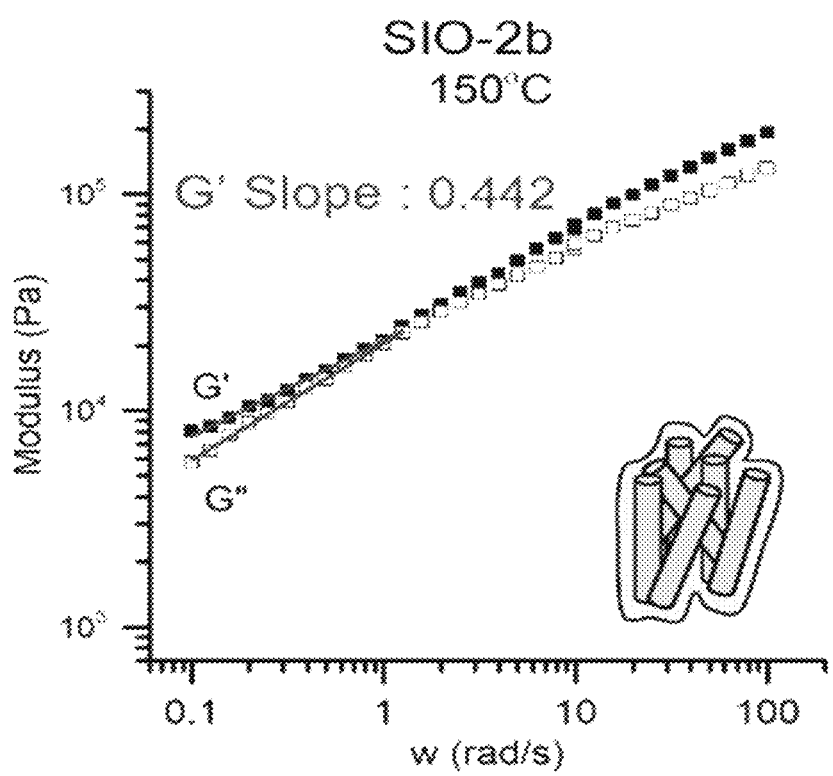

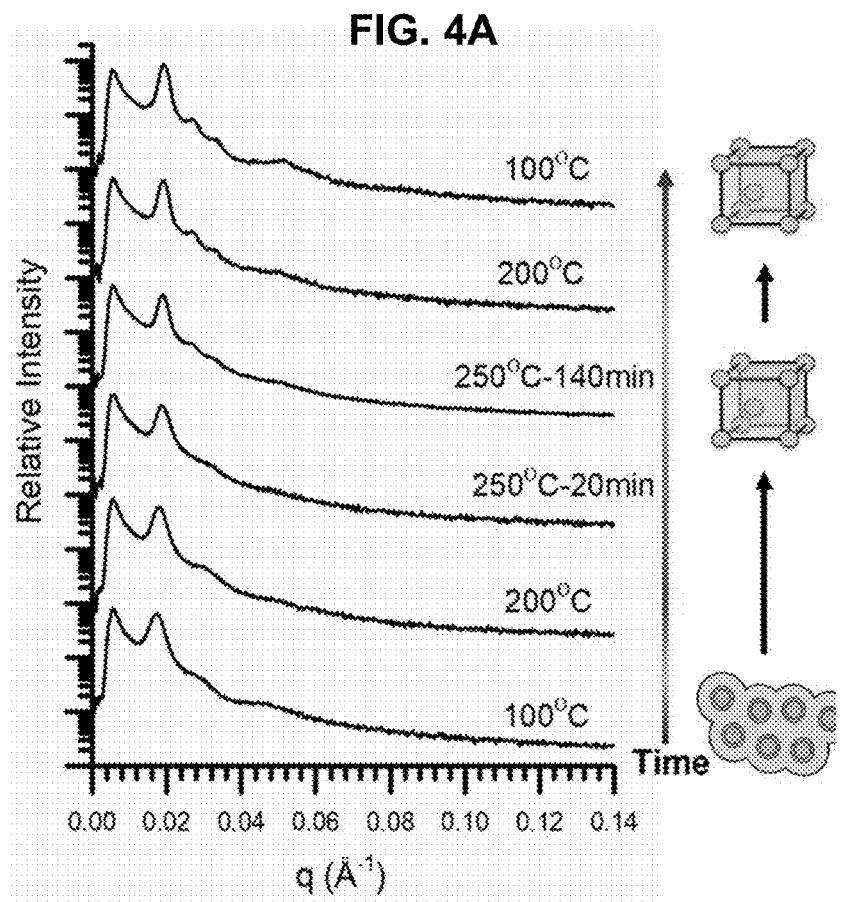
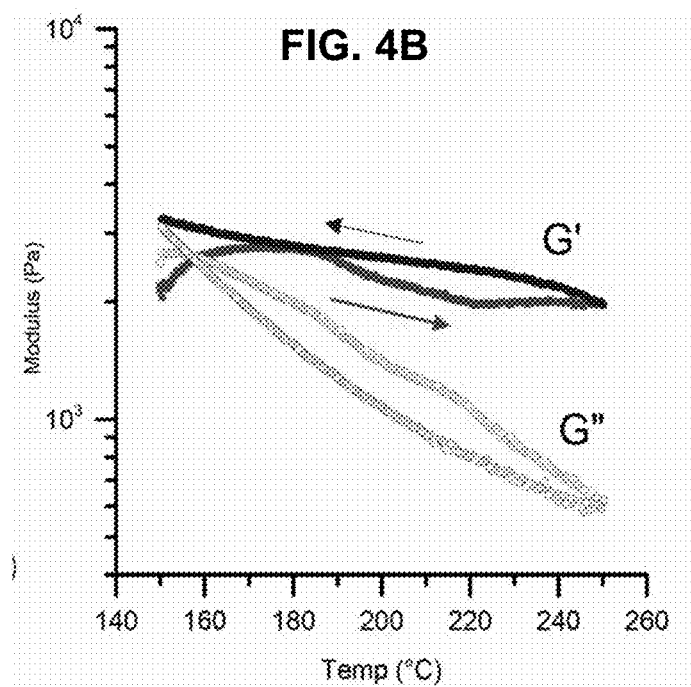

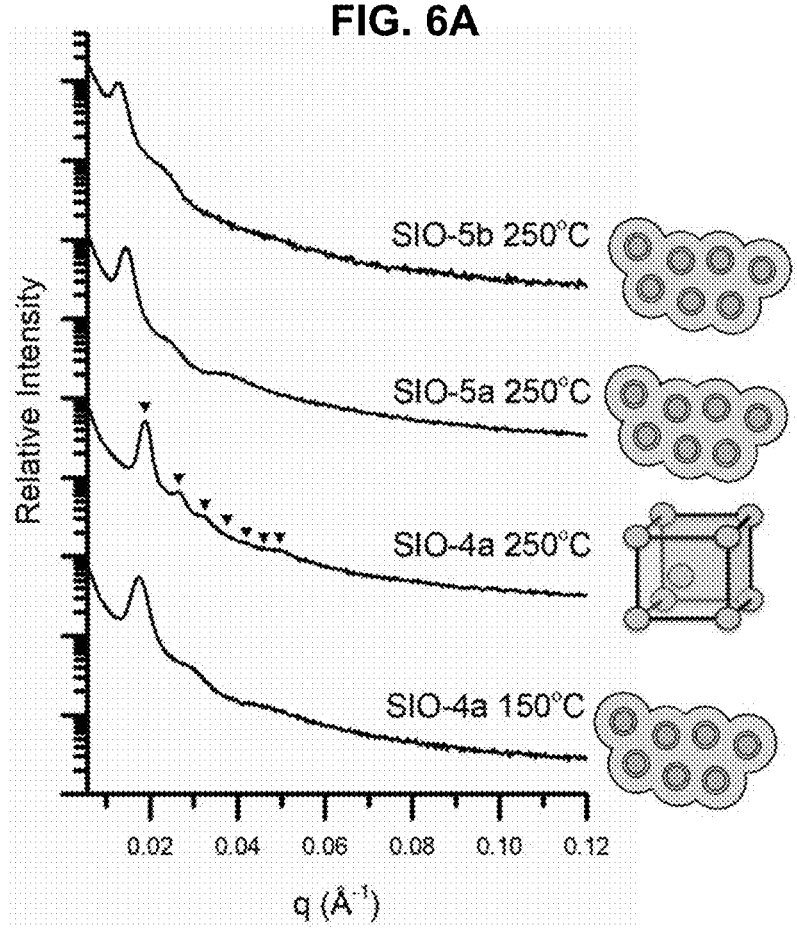

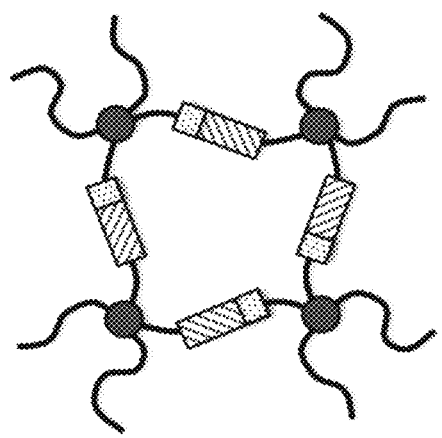
FIG. 8
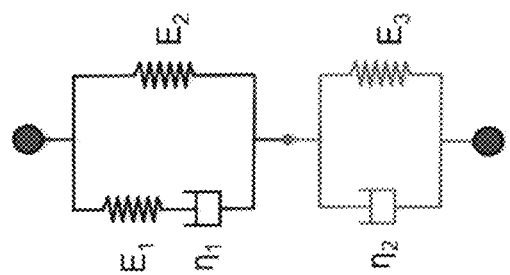
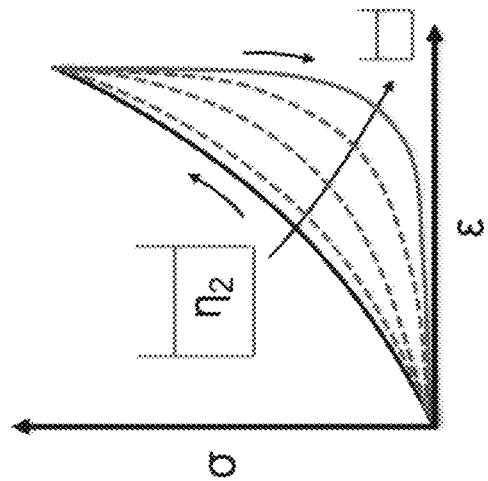

Tension:

Compression:

Lubricated

FIG. 13A
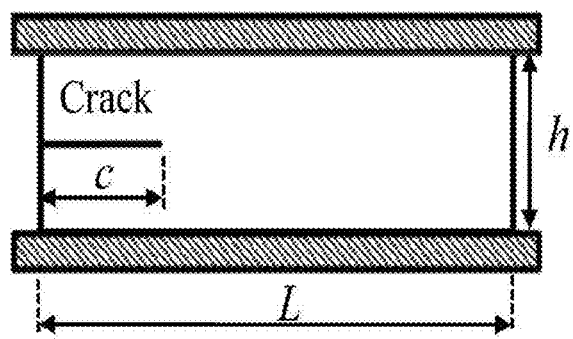
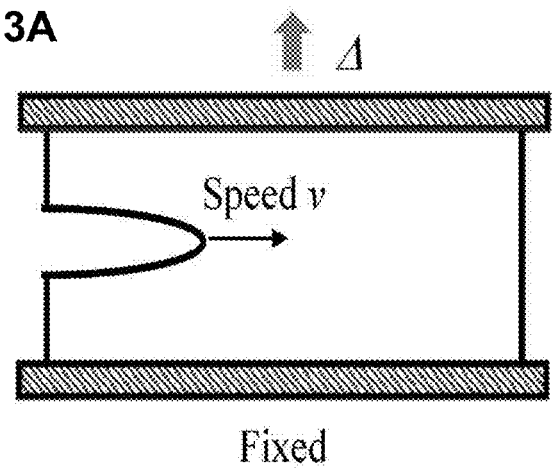
FIG. 13B
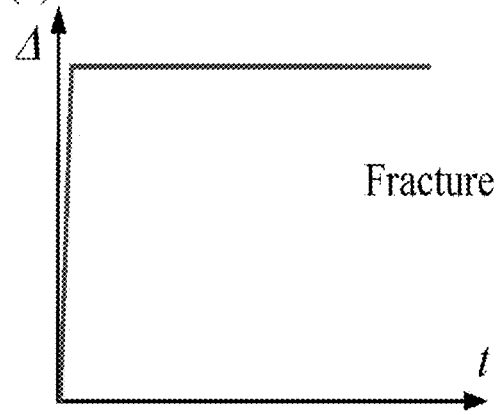
FIG. 13C
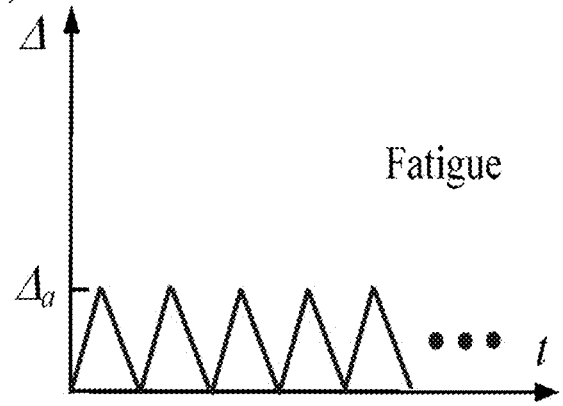

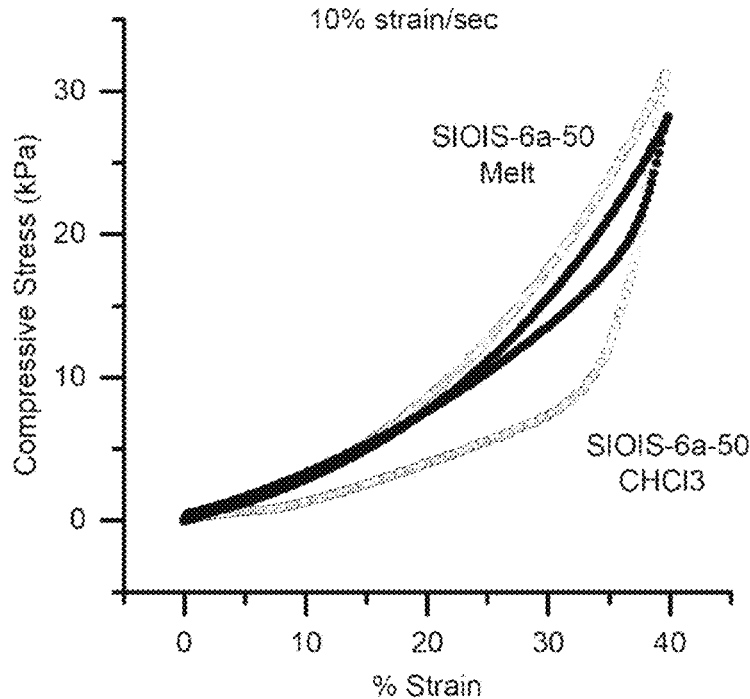
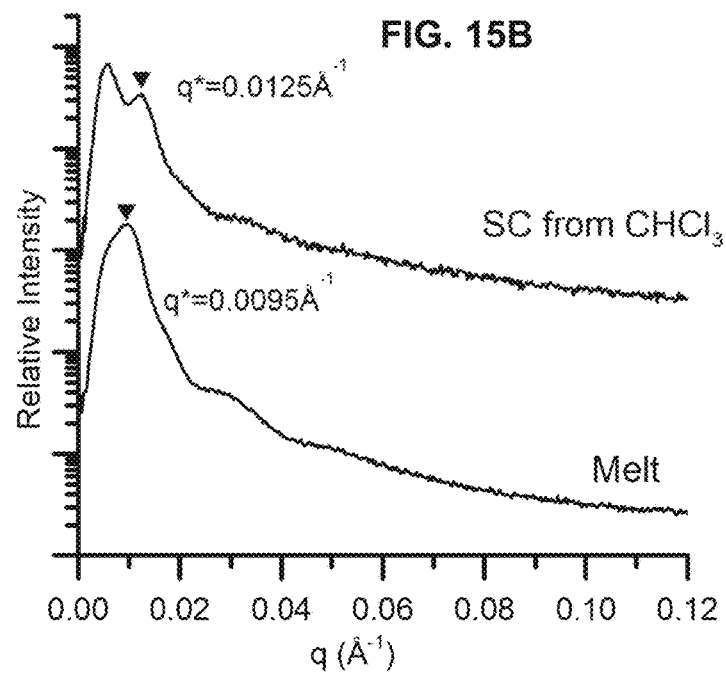

FATIGUE RESISTANT AND FRACTURE RESISTANT HYDROGELS

CROSS REFERENCE TO RELATED APPLICATION

This application claims the benefit of U.S. Provisional Application No. 63/070,059 filed on Aug. 25, 2020, the disclosure of which is hereby incorporated by reference in its entirety.

GOVERNMENTAL RIGHTS

This invention was made with government support under DMR-1808824 awarded by the National Science Foundation. The government has certain rights in the invention.

FIELD OF THE INVENTION

The present disclosure relates to triblock and pentablock copolymers and methods of making thereof. Aspects of the disclosure further relate to hydrogels that exhibit both fatigue resistance and fracture resistance with superior rates of recovery.

BACKGROUND OF THE INVENTION

Hydrogels can be used in a large range of applications including, but not limited to, separation membranes, rapid ion-transport membranes, pharmaceuticals, biomedical materials, cosmetics, and personal hygiene products. Ideally, hydrogels are tailorable to the performance demands of the intended application. Thus, hydrogels that are capable of sustaining repetitive stress dissipation without fatigue while suppressing susceptibility to fracture and failure are needed to ensure ideal performance. Effective integration of both dissipative capabilities and efficient elastic recovery, however, is limited using current hydrogel design strategies. Accordingly, there is a need in the field for improved hydrogel materials and hydrogels.

SUMMARY OF THE INVENTION

The present disclosure is based in part on uniquely designed block copolymers capable of forming tunable block copolymer hydrogels that may be fatigue resistant and fracture resistant.

In some embodiments, the present disclosure provides for polymeric materials. In some embodiments, polymeric materials herein may comprise a blend, wherein the blend may comprise at least one triblock copolymer and at least one pentablock copolymer. In some embodiments, polymeric materials herein may comprise at least one triblock copolymer according to formula (I):

A-B-C  (I)

wherein, A may be a polystyrene block; B may be a polydiene block; and C may be a polyalkylene oxide block. In some embodiments, polymeric materials herein may comprise at least one pentablock copolymer according to formula (II):

A-B-C-B-A  (II)

wherein, A may be a polystyrene block; B may be a polydiene block; and C may be a polyalkylene oxide block.

In some embodiments, polymeric materials herein may comprise a polydiene block, wherein the polydiene block may comprise a polybutadiene block or a polyisoprene block. In some embodiments, polymeric materials herein may comprise a polyalkylene oxide block, wherein the polyalkylene oxide block may comprise a polyethylene oxide block.

In some embodiments, polymeric materials herein may comprise A and B in a ratio. In some embodiments, polymeric materials herein may comprise a ratio of A to B, wherein a ratio of A to B may be 1:1 to 3:1. In some embodiments, polymeric materials herein may comprise A, B, and/or C at a particular volume fraction. In some embodiments, polymeric materials herein may comprise C, wherein a volume fraction for C may be at least about 0.8 to 0.9. In some embodiments, polymeric materials herein may comprise A and B, wherein a volume fraction for A and B combined may be 0.15 or less.

In some embodiments, polymeric materials herein may comprise a blend, wherein the blend may comprise at least one triblock copolymer and at least one pentablock copolymer in a molar ratio that may be from between 95:5 and 1:99 triblock copolymer to pentablock copolymer.

In some embodiments, the present disclosure provides for block copolymer hydrogels. In some embodiments, block copolymer hydrogels herein may comprise a glass formed from a dry blend comprising at least one triblock copolymer and at least one pentablock copolymer; and a liquid medium at a concentration between about 32:1 and about 2:1 liquid medium/dry blend by weight.

In some embodiments, block copolymer hydrogels herein may comprise at least one triblock copolymer according to formula (I):

A-B-C  (I)

wherein, A may be a polystyrene block; B may be a polydiene block; and C may be a polyalkylene oxide block. In some embodiments, block copolymer hydrogels herein may comprise at least one pentablock copolymer according to formula (II):

A-B-C-B-A  (II)

wherein, A may be a polystyrene block; B may be a polydiene block; and C may be a polyalkylene oxide block.

In some embodiments, block copolymer hydrogels herein may comprise a polydiene block, wherein the polydiene block may comprise a polybutadiene block or a polyisoprene block. In some embodiments, block copolymer hydrogels herein may comprise a polyalkylene oxide block, wherein the polyalkylene oxide block may comprise a polyethylene oxide block.

In some embodiments, block copolymer hydrogels herein may comprise a dry blend, wherein the dry blend may comprise at least one triblock copolymer and at least one pentablock copolymer in a molar ratio that may be from between 95:5 and 1:99 triblock copolymer to pentablock copolymer.

In some embodiments, block copolymer hydrogels herein may comprise at least one triblock copolymer and at least one pentablock copolymer wherein the at least one triblock copolymer and the at least one pentablock copolymer may form a core-shell sphere morphology. In some embodiments, block copolymer hydrogels herein may comprise at least one triblock copolymer and at least one pentablock copolymer wherein the at least one triblock copolymer and the at least one pentablock copolymer may form a core-shell sphere morphology comprising a spherical core comprising A; a shell comprising B; and a matrix comprising C.

In some embodiments, block copolymer hydrogels herein may have a fatigue resistance to at least 500,000 compression cycles. In some embodiments, block copolymer hydrogels herein may have a tensile modulus ranging between about 0.01 MPa and about 140 MPa.

In some embodiments, block copolymer hydrogels herein may further comprise an active pharmaceutical ingredient.

In some embodiments, the present disclosure provides for methods of preparing block copolymer hydrogels. In some embodiments, methods for preparing block copolymer hydrogels herein may comprise any one of the following: contacting at least one triblock copolymer and at least one pentablock copolymer in a molar ratio from between 95:5 and 1:99 triblock copolymer to pentablock copolymer to form an iblock-pentablock copolymer dry blend; heating the dry blend to form a triblock-pentablock copolymer melt; allowing the triblock-pentablock copolymer melt to attain ambient temperature to form a triblock-pentablock copolymer glass; and contacting the triblock-pentablock copolymer glass with a liquid medium to form a block copolymer hydrogel.

In some embodiments, methods for preparing block copolymer hydrogels herein may comprise a triblock-pentablock copolymer dry blend wherein the triblock-pentablock copolymer dry blend may be formed by dissolving the triblock copolymer and pentablock copolymer in an organic solvent and removing the organic solvent.

In some embodiments, methods for preparing block copolymer hydrogels herein may comprise a liquid medium wherein the liquid medium concentration may be between about 32:1 and about 4:1 liquid medium/triblock-pentablock copolymer by weight.

In some embodiments, the present disclosure provides for pharmaceutical compositions. In some embodiments, pharmaceutical compositions herein may comprise any one or more of the polymeric materials disclosed herein, and/or any one or more of the block copolymer hydrogels disclosed herein, and at least one excipient.

In some embodiments, the present disclosure provides for compositions comprising any one or more of the polymeric materials disclosed herein, and/or any one or more of the block copolymer hydrogels disclosed herein, wherein compositions herein may be hydrated adhesives, coating materials, elastic separation membranes, medical devices, mechanical energy absorbers, battery cell separators, fuel cell separators, or any combination thereof.

BRIEF DESCRIPTION OF THE FIGURES

The following drawings form part of the present specification and are included to further demonstrate certain aspects of the present disclosure, which can be better understood by reference to the drawing in combination with the detailed description of specific embodiments presented herein.

FIG. 2A depicts a SAXS analysis for SIO-3a at 150° C. showing the formation of unordered cylinders ordering into hexagonally packed cylinders (HPC) upon heating to 250° C. in accordance with the present disclosure. The HPC morphology is maintained upon cooling.

FIG. 2B depicts a DMS analysis for SIO-3a from 100° C. to 250° C. in accordance with the present disclosure. Red is the first heating cycle and blue is the subsequent cooling cycle. The rise in both the elastic and loss modulus show the ordering of the cylinders into the HPC morphology which remains upon cooling.

FIGS. 3B-3E depict representative images of frequency sweeps at 150° C. for SIO-3a (FIG. 3B), SIO-2a (FIG. 3C), SIO-1a (FIG. 3D), and SIO-2b (FIG. 3E) in accordance with the present disclosure. Frequency sweeps showed the presence of HPC in SIO-3a because of a flat slope while the larger slopes for the higher molecular weight samples confirm the formation of disordered cylinders.

FIG. 4A depicts a representative image of a SIO-4a SAXS temperature ramp in accordance with the present disclosure. The polymer first formed a liquid-like packing of spheres and upon annealing ordered into a body-centered cubic structure.

FIG. 4B depicts a representative image of a DMS analysis for SIO-4a in accordance with the present disclosure. The DMS showed that after heating the sample to 250° C., both the elastic and loss modulus flattened as the temperature decreased.

FIG. 6A depicts a representative image of SAXS profiles for SIO-4a at 150° C. and SIO-4a, 5a, and 5b annealed to 250° C. in accordance with the present disclosure. The scattering intensity profile for SIO-4a before anneal was similar to SIO-5a, 5b and, 5c indicating that 5a, 5b, and 5c were phase separating into a liquid-like packing of spheres while SIO-4a after annealing was forming a BCC structure.

FIG. 8 depicts a schematic of a network architecture in which the elastic and dissipative contributions to the network are closely correlated, favoring precise reassembly of the network upon removal of load. Network design was predicated on producing bulk viscoelastic behavior of the system that maps directly into each strand in the network, and (2) that every dissipative mechanism introduced ($\eta_{12}$) was implicitly coupled to its own driving force for elastic recovery ($E_3$). Tuning the amount of energy dissipated with each cycle may be tailored by swapping out the dissipative Kelvin-Voigt element for another, in which the values of $\eta_{12}$ and $E_3$ have been tuned for application specificity.

FIGS. 13A-13C depict schematics of the pure-shear configuration for fracture test (FIG. 13A); the loading history for fracture test (FIG. 13B); and the loading history for fatigue test (FIG. 13C).

FIGS. 15A-15B depict a compressive stress-strain curve for a hydrogel made from large molecular weight PS, SIOIS-6a-50, processed by heating in the melt and by solvent-casting from CHCl3 (FIG. 15A) and a SAXS analysis of a SIO-6a polymer which was coupled to form a hydrogel (FIG. 15B).

DETAILED DESCRIPTION OF THE INVENTION

Figure 1:
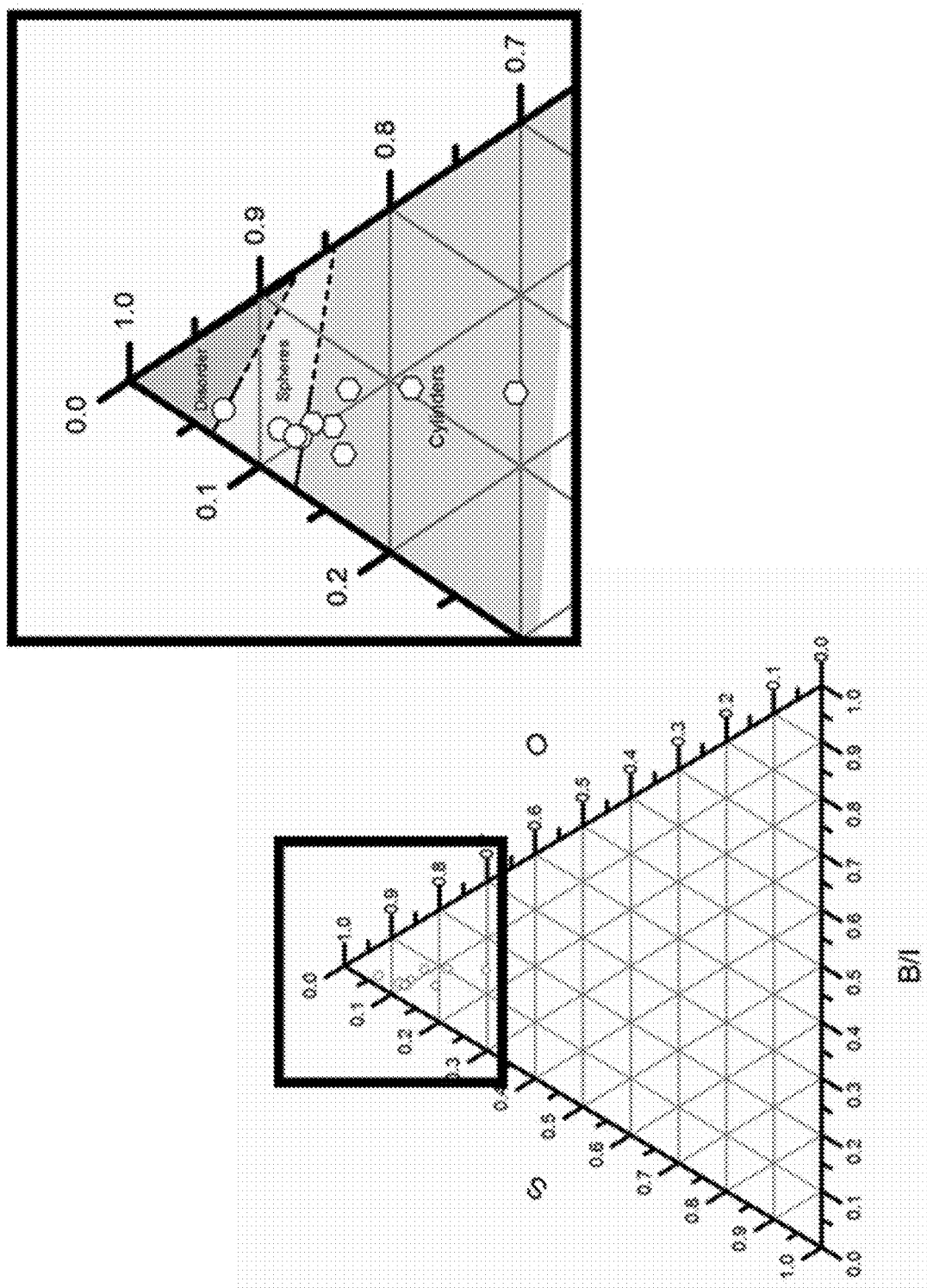
FIG. 1 depicts a close up SIO phase diagram showing investigated cylinders, spheres, and disorder regions in accordance with the present disclosure. Hexagons are SBO and SIO polymers which form cylinder-type morphologies. Circles represent SIO polymers which form sphere-type morphologies. The dotted lines in the phase regions denote where experimental data is still needed to confirm the phase boundary.

The present disclosure may be understood by reference to the following detailed description, taken in conjunction with the drawings as described above.

A block copolymer is a polymer that consists of multiple different types of polymer chains that are covalently attached to each other. The monomers comprising a block copolymer are referred to as "A block", "B block", and the like. Accordingly, a diblock copolymer comprised of A and B blocks can be referred to as an AB block copolymer whereas triblock copolymer comprised of A, B, and C blocks can be referred to as an ABC block copolymer. Further, triblock copolymers may be combined to form a pentablock copolymer which can be referred to as a ABCBA block copolymer. AB block copolymer morphology is governed by two variables, volume fraction of one block ($f_A$) and the Flory-Huggins interaction parameter between the blocks ($\chi_{AB}$). Adding just one block adds more variables which govern phase separation; ABC block copolymers are governed by the volume fractions of two blocks (which necessarily determine the third) ($f_A$, $f_B$) and the interaction parameters between all three blocks ($\chi_{AB}$, $\chi_{AC}$, $\chi_{BC}$). In contrast to AB block copolymers, the added block in ABC block polymers allows for formation of multicompartment spheres in the micelle configurations depending on the X interactions between each block. For polymers with no frustration in the block order ($\chi AB < \chi BC < \chi AC$) a core-shell sphere morphology is predicted; however, formation of this core-shell sphere morphology has rarely been observed. Sphere-forming block copolymers can make mechanically robust hydrogels.

The present disclosure is based in part on the uniquely designed block copolymers herein which upon heating self-assemble into highly efficient network structures based on core-shell sphere morphologies. Block copolymers herein can be used to form mechanically robust hydrogels are both fatigue resistant and fracture resistant. A blend of block copolymers herein can generate highly elastic hydrogel networks in which fatigue is minimal but very little energy is dissipated and/or highly dissipative hydrogel networks in which toughness is maximized at the expense of fatigue levels that are prohibitive, or rate limited by long recovery times. Accordingly, the present disclosure provides block copolymers compositions and methods of making thereof, as well as hydrogel compositions and methods of making thereof.

I. Definitions

As used herein, the terms "about" and "approximately" designate that a value is within a statistically meaningful range. Such a range can be typically within 20%, more typically still within 10%, and even more typically within 5% of a given value or range. The allowable variation encompassed by the terms "about" and "approximately" depends on the particular system under study and can be readily appreciated by one of ordinary skill in the art.

When introducing elements of the present disclosure or the preferred embodiments(s) thereof, the articles "a," "an," "the," and "said" are intended to mean that there are one or more of the elements. The terms "comprising," "including,"

and "having" are intended to be inclusive and mean that there may be additional elements other than the listed elements.

As used herein "ambient temperature" is the temperature of the environment surrounding the process or experimental apparatus.

As used herein, the term "glass" refers to completely vitrified solids as well as to partially crystalline or glassy solids. Generally, a "glass" is a material below its glass transition temperature ($T_g$), as defined by for example differential scanning calorimetry (DSC) or dynamic mechanical analysis (DMA). Use temperatures defined as a range include all temperatures in which the swelling medium remains in the liquid phase. For aqueous media this may have a range including 0-100° C. For room temperature ionic liquids, as described herein, this may have a range from 0-160° C. Typically, the glassy domains may have a glass transition temperature of at least 60° C.

As used herein, the term "hydrogel" refers to a gel in which the liquid component is an aqueous medium.

As used herein, the term "monomer" refers to any chemical compound capable of forming a covalent bond with itself or a chemically different compound in a repetitive manner. The repetitive bond formation between monomers may lead to a linear, branched, super-branched, or three-dimensional product. Furthermore, monomers may themselves comprise repetitive building blocks, and when polymerized the polymers formed from such monomers are then termed "block polymers." Monomers may belong to various chemical classes of molecules including organic, organometallic or inorganic molecules. The molecular weight of monomers may vary greatly between about 40 Daltons and 20000 kDaltons. However, especially when monomers comprise repetitive building blocks, monomers may have even higher molecular weights. Monomers may also include additional reactive groups.

II. Polymeric Materials

In some embodiments, the present invention provides polymeric materials comprising block copolymers. Block copolymers consist of two or more strands ("blocks" or "polymer blocks") of different polymers chemically attached to each other. Properties of block copolymers herein can depend on copolymer sequence distribution, chemical nature of the blocks, average molecular weight, molecular weight distribution of the blocks and the copolymer, and any combination thereof.

a) Polymer Blocks

In some embodiments, polymer blocks herein may be selected to impart certain properties and/or characteristics on triblock copolymers, pentablock copolymers, and/or hydrogel compositions herein.

In some embodiments, a polymer block used in compositions herein may comprise at least one polyalkylene oxide block. Non-limiting examples of polyalkylenes for use in polyalkylene oxide block can include poly(butylene), poly(butyl ethylene), poly(cyclohexylethylene), poly(ethylene), poly(heptylethylene), poly(hexylethylene), poly(isobutene), poly(isobutylethylene), poly(isopropylethylene), poly(2-methylbutene), poly(octylethylene), poly(pentylethylene), poly(propylene), poly(propylethylene), poly(tert-butylethylene), and the like.

In some aspects, a polyalkylene oxide block herein may be polyethylene oxide (PEO). In some embodiments, a PEO may have an average molecular weight of 30 kDa to 800 kDa. In some aspects, a PEO may have an average molecular weight from about 30 kDa to about 35 kDa, from about 35 kDa to about 40 kDa from about 40 kDa to about 45 kDa, from about 45 kDa to about 50 kDa, from about 50 kDa to about 55 kDa, from about 55 kDa to about 60 kDa, from about 60 kDa to about 65 kDa, from about 65 kDa to about 70 kDa, from about 70 kDa to about 75 kDa, from about 75 kDa to about 80 kDa, from about 80 kDa to about 85 kDa, from about 85 kDa to about 90 kDa, from about 90 kDa to about 95 kDa, from about 95 kDa to about 100 kDa, from about 100 kDa to about 105 kDa, from about 105 kDa to about 110 kDa, from about 110 kDa to about 115 kDa, from about 115 kDa to about 120 kDa, from about 120 kDa to about 125 kDa, from about 125 kDa to about 130 kDa, from about 130 kDa to about 135 kDa, from about 135 kDa to about 140 kDa, from about 140 kDa to about 145 kDa, from about 145 kDa to about 150 kDa, from about 150 kDa to about 155 kDa, from about 155 kDa to about 160 kDa, from about 160 kDa to about 170 kDa, from about 170 kDa to about 180 kDa, from about 180 kDa to about 190 kDa, from about 190 kDa to about 200 kDa, from about 200 kDa to about 250 kDa, from about 250 kDa to about 300 kDa, from about 300 kDa to about 350 kDa, from about 350 kDa to about 400 kDa, from about 400 kDa to about 450 kDa, from about 450 kDa to about 500 kDa, from about 500 kDa to about 550 kDa, from about 550 kDa to about 600 kDa, from about 600 kDa to about 650 kDa, from about 650 kDa to about 700 kDa, or from about 750 kDa to about 800 kDa. In some aspects, a PEO may have an average molecular weight of greater than about 100 kDa. In some aspects, a may have an average molecular weight of less than 400 kDa.

In some embodiments, a polymer block used in compositions herein may comprise at least one polystyrene block (PS). In some embodiments, a PS may have an average molecular weight of 3 kDa to 80 kDa. In some aspects, a PS may have an average molecular weight from about 3 kDa to about 5 kDa, from about 5 kDa to about 10 kDa, from about 10 kDa to about 15 kDa, from about 15 kDa to about 20 kDa, from about 20 kDa to about 25 kDa, from about 25 kDa to about 30 kDa, from about 30 kDa to about 35 kDa, from about 35 kDa to about 40 kDa from about 40 kDa to about 45 kDa, from about 45 kDa to about 50 kDa, from about 50 kDa to about 55 kDa, from about 55 kDa to about 60 kDa, from about 60 kDa to about 65 kDa, from about 65 kDa to about 70 kDa, from about 70 kDa to about 75 kDa, or from about 75 kDa to about 80 kDa. In some aspects, a PS may have an average molecular weight of greater than about 3 kDa. The PS may have an average molecular weight of less than 80 kDa. In some aspects, a PS may have an average molecular weight between about 5 kDa and about 20 kDa.

In some embodiments, a polymer block used in compositions herein may comprise at least one polydiene block. Polydienes are amorphous polymers having a glass transition temperature below room temperature, usually ranging between 170 and 250 K (−100° C. and −25° C.). They contain unsaturated sites and are often vulcanized (lightly cross-linked) to create an elastomeric network, which resists irreversible deformation below the break load. Non-limiting examples of polydienes can include styrene-butadiene rubber, polybutadiene, nitrile-butadiene rubber, polychloroprene, polyisoprene, and the like.

In some embodiments, a polymer block used in compositions herein may comprise at least one polybutadiene block (PB). In some embodiments, a PB may have an average molecular weight of 1 kDa to 100 kDa. In some aspects, a PB may have an average molecular weight from about 1 kDa to about 3 kDa, about 3 kDa to about 5 kDa, from about 5 kDa to about 10 kDa, from about 10 kDa to about 15 kDa, from about 15 kDa to about 20 kDa, from about 20 kDa to about 25 kDa, from about 25 kDa to about 30 kDa, from about 30 kDa to about 35 kDa, from about 35 kDa to about 40 kDa from about 40 kDa to about 45 kDa, from about 45 kDa to about 50 kDa, from about 50 kDa to about 55 kDa, from about 55 kDa to about 60 kDa, from about 60 kDa to about 65 kDa, from about 65 kDa to about 70 kDa, from about 70 kDa to about 75 kDa, from about 75 kDa to about 80 kDa, from about 80 kDa to about 85 kDa, from about 85 kDa to about 90 kDa, from about 90 kDa to about 95 kDa, or from about 95 kDa to about 100 kDa. In some aspects, a PB may have an average molecular weight between about 4 kDa and about 20 kDa.

In some embodiments, a polymer block used in compositions herein may comprise at least one polyisoprene block (PI). In some embodiments, a PI may have an average molecular weight of 1 kDa to 100 kDa. In some aspects, a PI may have an average molecular weight from about 1 kDa to about 5 kDa, from about 5 kDa to about 10 kDa, from about 10 kDa to about 15 kDa, from about 15 kDa to about 20 kDa, from about 20 kDa to about 25 kDa, from about 25 kDa to about 30 kDa, from about 30 kDa to about 35 kDa, from about 35 kDa to about 40 kDa from about 40 kDa to about 45 kDa, from about 45 kDa to about 50 kDa, from about 50 kDa to about 55 kDa, from about 55 kDa to about 60 kDa, from about 60 kDa to about 65 kDa, from about 65 kDa to about 70 kDa, from about 70 kDa to about 75 kDa, from about 75 kDa to about 80 kDa, from about 80 kDa to about 85 kDa, from about 85 kDa to about 90 kDa, from about 90 kDa to about 95 kDa, or from about 95 kDa to about 100 kDa. In some aspects, a PI may have an average molecular weight between about 1 kDa and about 40 kDa.

In some embodiments, a PS, a PB, and/or a PI may be completely or partially hydrogenated. A hydrogenated PS, PB, and/or PI herein may yield cyclohexyl, cyclohexenyl, and/or cyclohexadienyl moieties. For example, PS, PB, and/or PI domain of the block copolymer may be based on the hydrogenated forms of styrenic monomers, such as vinyl cylcohexylethylene. In some aspects, hydrogenation of a PS, a PB, and/or a PI herein may occur under increased partial pressure of hydrogen with or without a catalyst, such as palladium, platinum, rhodium, ruthenium, nickel, or other metal. In some aspects, a catalyst may have a support matrix, such as calcium carbonate ($CaCO_3$), carbon, porous silica, and the like. Suitable examples of hydrogenation catalysts include, but are not limited to, palladium on carbon, palladium on calcium carbonate, and platinum on porous silica.

In some embodiments, a polymer block herein having varying vinyl content may be hydrogenated. In some embodiments, a polymer block herein having about 3% to about 40% vinyl content may be hydrogenated. In some embodiments, polybutadienes of varying vinyl content may be hydrogenated. In some embodiments, a PB may comprise about 3% to about 40% vinyl groups per repeated monomeric unit. In some embodiments, hydrogenation of PB may transform PB into polyethylethylene (PEE).

In some embodiments, triblock and pentablock copolymers herein may comprise at least one hydrogenated polymer block. In some embodiments, triblock and pentablock copolymers herein may comprise at least one hydrogenated polydiene block. In some embodiments, triblock and pentablock copolymers herein may comprise at least one hydrogenated PB block. In some embodiments, triblock and pentablock copolymers herein may comprise at least one hydrogenated PB block wherein hydrogenation of PB transforms the polymer block into PEE. In some embodiments, triblock and pentablock copolymers herein may comprise at least one PEE. In some embodiments, triblock and pentablock copolymers herein may comprise at least one hydrogenated PB and PI, such as, but not limited to ethyl butylene and ethyl propylene.

In some embodiments, a PS, a PB, and/or a PI may be chemically modified. In some aspects, a PS, a PB, and/or a PI may be chemically modified using addition across the double bond to include moieties containing other function groups. Non-limiting examples of functional groups that can be added to the end of polymer blocks herein can include hydroxyl groups, sulfhydryl groups, carbonyl groups, carboxyl groups, amino groups, phosphate groups. In some examples, ionic moieties, polar moieties, oligosaccharide moieties, zwitterionic groups, carboxylic acid groups, carboxylate groups, sulfonic acid groups, diol groups, dicarboxylic acid groups, thiol groups and the like may be added to the end of polymer block herein.

b) Triblock Copolymers

The present invention provides polymeric materials comprising triblock copolymers. In some embodiments, triblock copolymers herein may adopt a cylinder morphology. In some embodiments, triblock copolymers herein may adopt a sphere morphology. In some embodiments, triblock copolymers herein may adopt a core-shell sphere morphology. In some embodiments, triblock copolymers herein may hermodynamically adopt a cylinder morphology, a sphere morphology, and/or core-shell sphere morphology during microphase separation of the blocks.

In some embodiments, triblock copolymers having a sphere morphology may have diameters between about 1 nm and about 300 nm (e.g., about 1, 5, 10, 15, 20, 25, 30, 35, 40, 45, 50, 55, 60, 65, 70, 75, 80, 85, 90, 95, 100, 120, 140, 160, 180, 200, 220, 240, 260, 280, 300 nm). In some embodiments, triblock copolymers having a sphere morphology may have a sphere volume fraction. In some embodiments, triblock copolymers having a core-shell sphere morphology may have core diameters between about 0.5 nm and about 300 nm (e.g., about 0.5, 1, 5, 10, 15, 20, 25, 30, 35, 40, 50, 60, 70, 80, 90, 100, 120, 140, 160, 180, 200, 220, 240, 260, 280, 300 nm). One of skill in the art will appreciate that core diameters can vary depending on the molecular weight and composition of the specific block copolymer. The core diameters may be centered about a mean value plus or minus a couple nanometers, with the breadth of this distribution narrowing with increased annealing time in the melt.

In some embodiments, triblock copolymers herein may contain at least three polymer blocks according to formula (I):

A-B-C            (I)

wherein A, B, and C are polymer blocks. In some aspects, at least one of A, B, or C is a different polymer block than the other two. In some aspects, A, B, or C are different polymer blocks than each other.

In some embodiments, polymeric materials herein can include a triblock copolymer according to formula (I):

A-B-C            (I)

wherein A, B, and C are polymer blocks selected from a polystyrene block, a polydiene block, and a polyalkylene oxide block. In some embodiments, the order of the polymer blocks is random. In some embodiments, the order of the polymer blocks is specific. In some embodiments, A is a polystyrene block; B is a polydiene block; and C is a polyalkylene oxide block. In some embodiments, a polyalkylene oxide block is a poly(ethylene oxide) (PEO) block In some embodiments, a polydiene block is polybutadiene block or a polyisoprene block. In some embodiments, A is a polystyrene block; B is a polybutadiene block; and C is a poly(ethylene oxide) block. In some embodiments, A is a polystyrene block; B is a polyisoprene block; and C is a poly(ethylene oxide) block.

In some embodiments, triblock copolymers herein may comprise polymer blocks ranging in number average molecular weight (Mn) and/or volume fraction of the final triblock copolymer. Methods of measuring Mn and/or volume fraction are known in the art and suitable for use herein. In some embodiments, Mn may be determined by proton nuclear magnetic resonance ($^1$H-NMR). In some embodiments, volume fractions (f) may be calculated from monomer weight and polymer densities at a desired temperature. In some aspects, a desired temperate suitable for measuring volume fractions may be about 120° C. to about 150° C.

In some embodiments, triblock copolymers herein may comprise a polystyrene block having a number average molecular weight ranging from about 4000 Mn to about 80000 Mn. In some aspects, triblock copolymers herein may comprise a polystyrene block having a number average molecular weight of about 4000 Mn, about 4500 Mn, about 5000 Mn, about 5500 Mn, about 6000 Mn, about 6500 Mn, about 7000 Mn, about 7500 Mn, about 8000 Mn, about 8500 Mn, about 9000 Mn, about 9500 Mn, about 10000 Mn, about 10500 Mn, about 11000 Mn, about 11500 Mn, about 12000 Mn, about 12500 Mn, about 13000 Mn, about 13500 Mn, about 14000 Mn, about 14500 Mn, about 15000 Mn. 15500 Mn, about 16000 Mn, about 16500 Mn, about 17000 Mn, about 17500 Mn, about 18000 Mn, about 18500 Mn, about 19000 Mn, about 19500 Mn, about 20000 Mn, about 25000 Mn, about 25500 Mn, about 30000 Mn, about 35000 Mn, about 40000 Mn, about 45000 Mn, about 50000 Mn, about 55000 Mn, about 60000 Mn, about 65000 Mn, about 70000, about 75000 Mn, or about 80000 Mn. In some aspects, triblock copolymers herein may comprise a polystyrene block having a number average molecular weight of ranging from about 7500 Mn to about 17500 Mn.

In some embodiments, triblock copolymers herein may comprise a polystyrene block wherein the volume fraction ranges from about 0.05 f to about 0.8 f. In some aspects, triblock copolymers herein may comprise a polystyrene block wherein the volume fraction may be about 0.05, about 0.01, about 0.02, about 0.03, about 0.04, about 0.05, about 0.06, about 0.07, about 0.08, about 0.09, about 0.1, about 0.2, about 0.3, about 0.4, about 0.5, about 0.6, about 0.7, or about 0.8 f. In some aspects, triblock copolymers herein may comprise a polystyrene block wherein the volume fraction may be about 0.05 to about 0.1 f.

In some embodiments, triblock copolymers herein may comprise a polydiene block having a number average molecular weight ranging from about 1000 Mn to about 40000 Mn. In some embodiments, triblock copolymers herein may comprise a polydiene block wherein the volume fraction ranges from about 0.01 f to about 0.3 f.

In some embodiments, triblock copolymers herein may comprise a polybutadiene block having a number average molecular weight ranging from about 1000 Mn to about 100000 Mn. In some aspects, triblock copolymers herein may comprise a polybutadiene block having a number average molecular weight of about 1000 Mn, about 1500 Mn, about 2000 Mn, about 2500 Mn, about 3000 Mn, about 3500 Mn, about 4000 Mn, about 4500 Mn, about 5000 Mn, about 5500 Mn, about 6000 Mn, about 6500 Mn, about 7000 Mn, about 7500 Mn, about 8000 Mn, about 8500 Mn, about 9000 Mn, about 9500 Mn, about 10000 Mn, about 11000 Mn, about 11500 Mn, about 12000 Mn, about 12500 Mn, about 13000 Mn, about 13500 Mn, about 14000 Mn, about 14500 Mn, about 15000 Mn. 15500 Mn, about 16000 Mn, about 16500 Mn, about 17000 Mn, about 17500 Mn, about 18000 Mn, about 18500 Mn, about 19000 Mn, about 19500 Mn, about 20000 Mn, about 25000 Mn, about 25500 Mn, about 30000 Mn, about 35000 Mn, about 40000 Mn, about 45000 Mn, about 50000 Mn, about 55000 Mn, about 60000 Mn, about 65000 Mn, about 70000, about 75000 Mn, about 80000 Mn, about 85000 Mn, about 90000 Mn, about 95000 Mn, or about 100000 Mn. In some aspects, triblock copolymers herein may comprise a polybutadiene block having a number average molecular weight of ranging from about 2000 Mn to about 8500 Mn.

In some embodiments, triblock copolymers herein may comprise a polybutadiene block wherein the volume fraction ranges from about 0.01 f to about 0.3 f. In some aspects, triblock copolymers herein may comprise a polybutadiene block wherein the volume fraction may be about 0.01, about 0.02, about 0.03, about 0.04, about 0.05, about 0.06, about 0.07, about 0.08, about 0.09, about 0.1, about 0.15, about 0.2, about 0.25, or about 0.3 f. In some aspects, triblock copolymers herein may comprise a polybutadiene block wherein the volume fraction may be about 0.01 to about 0.05 f.

In some embodiments, triblock copolymers herein may comprise a polyisoprene block having a number average molecular weight ranging from about 1000 Mn to about 100000 Mn. In some aspects, triblock copolymers herein may comprise a polyisoprene block having a number average molecular weight of about 1000 Mn, about 1500 Mn, about 2000 Mn, about 2500 Mn, about 3000 Mn, about 3500 Mn, about 4000 Mn, about 4500 Mn, about 5000 Mn, about 5500 Mn, about 6000 Mn, about 6500 Mn, about 7000 Mn, about 7500 Mn, about 8000 Mn, about 8500 Mn, about 9000 Mn, about 9500 Mn or about 10000 Mn, about 11000 Mn, about 11500 Mn, about 12000 Mn, about 12500 Mn, about 13000 Mn, about 13500 Mn, about 14000 Mn, about 14500 Mn, about 15000 Mn. 15500 Mn, about 16000 Mn, about 16500 Mn, about 17000 Mn, about 17500 Mn, about 18000 Mn, about 18500 Mn, about 19000 Mn, about 19500 Mn, about 20000 Mn, about 25000 Mn, about 25500 Mn, about 30000 Mn, about 35000 Mn, about 40000 Mn, about 45000 Mn, about 50000 Mn, about 55000 Mn, about 60000 Mn, about 65000 Mn, about 70000, about 75000 Mn, about 80000 Mn, about 85000 Mn, about 90000 Mn, about 95000 Mn, or about 100000 Mn. In some aspects, triblock copolymers herein may comprise a polyisoprene block having a number average molecular weight of ranging from about 2000 Mn to about 8500 Mn.

In some embodiments, triblock copolymers herein may comprise a polyisoprene block wherein the volume fraction ranges from about 0.01 f to about 0.3 f. In some aspects, triblock copolymers herein may comprise a polyisoprene block wherein the volume fraction may be about 0.01, about 0.02, about 0.03, about 0.04, about 0.05, about 0.06, about 0.07, about 0.08, about 0.09, about 0.1, about 0.2, or about 0.3 f. In some aspects, triblock copolymers herein may comprise a polyisoprene block wherein the volume fraction may be about 0.01 to about 0.05 f.

In some embodiments, triblock copolymers herein may comprise a PEO block having a number average molecular weight ranging from about 30,000 Mn to about 800,000 Mn. In some aspects, triblock copolymers herein may comprise a PEO block having a number average molecular weight of about 30,000 Mn, about 35,000 Mn, about 40,000 Mn, about 45,000 Mn, about 50,000 Mn, about 55,000 Mn, about 60,000 Mn, about 65,000 Mn, about 70,000, about 75000 Mn, about 80000 Mn, about 85000 Mn, about 90000 Mn, about 95000 Mn, about 100000 Mn, about 150000 Mn, about 200,000 Mn, about 250,000 Mn, about 300,000 Mn, about 350,000 Mn, about 400,000 Mn, about 450,000 Mn, about 500,000 Mn, about 550,000 Mn, about 600,000 Mn, about 650,000 Mn, about 700,000 Mn, about 750,000 Mn, or about 800,000 Mn. In some aspects, triblock copolymers herein may comprise a PEO block having a number average molecular weight of ranging from about 80,000 Mn to about 200,000 Mn.

In some embodiments, triblock copolymers herein may comprise a PEO block wherein the volume fraction ranges from about 0.6 f to about 0.95 f. In some aspects, triblock copolymers herein may comprise a PEO block wherein the volume fraction may be about 0.6, about 0.65, about 0.7, about 0.75, about 0.8, about 0.85, about 0.9, or about 0.95 f. In some aspects, triblock copolymers herein may comprise a PEO block wherein the volume fraction may be about 0.75 to about 0.9 f.

In some embodiments, triblock copolymers herein may comprise a sphere morphology in the melt with polymer blocks larger than about 100 kDa. In some embodiments, triblock copolymers herein may comprise a sphere morphology in the melt with polymer blocks ranging from about 100 kDa to about 500 kDa (e.g., about 100, 150, 200, 250, 300, 350, 400, 450, 500 kDa).

In some embodiments, triblock copolymers herein may comprise a sphere morphology when the volume fraction of C (f c) is larger than the combined volume fraction of A ($f_A$) and B ($f_B$). In some embodiments, triblock copolymers herein may comprise a sphere morphology when the volume fraction of C (fc) is about 0.75 f to about 0.90 f (e.g., about 0.75, 0.80, 0.85, 0.90 f). In some aspects, triblock copolymers herein may comprise a sphere morphology when the volume fraction of C (fc) is about 0.85 f to about 0.90 f (e.g., about 0.85, 0.86, 0.87, 0.88, 0.89, 0.90 f).

In some embodiments, triblock copolymers herein may comprise a sphere morphology when the combined volume fraction of A ($f_A$) and B ($f_B$) is about 0.1 f to about 0.4 f (e.g., about 0.1, 0.15, 0.2, 0.25, 0.3, 0.35, 0.4 f). In some aspects, triblock copolymers herein may comprise a sphere morphology when the combined volume fraction of A ($f_A$) and B ($f_B$) is about 0.1 f to about 0.15 f (e.g., about 0.1, 0.11, 0.12, 0.13, 0.14, 0.15 f).

In some embodiments, triblock copolymers herein may comprise a sphere morphology when the ratio of the volume fraction of A block to B block in the triblock copolymer ranges from about 1:1 to about 1:10 (e.g., 1:1, 1:2, 1:3, 1:4, 1:5, 1:6, 1:7, 1:8, 1:8, 1:9, 1:10). In some aspects triblock copolymers herein may comprise a sphere morphology when the ratio of the volume fraction of A block to B block in the triblock copolymer is about 1:3.

c) Pentablock Copolymers

The present invention provides polymeric materials comprising pentablock copolymers. In some embodiments, pentablock copolymers herein may adopt a cylinder morphology. In some embodiments, pentablock copolymers herein may adopt a sphere morphology. In some embodiments, pentablock copolymers herein may adopt a core-shell sphere morphology. In some embodiments, pentablock copolymers herein may thermodynamically adopt a cylinder morphology, a sphere morphology, and/or core-shell sphere morphology during microphase separation of the blocks.

In some embodiments, pentablock copolymers having a sphere morphology may have diameters between about 1 nm and about 300 nm (e.g., about 1, 5, 10, 15, 20, 25, 30, 35, 40, 45, 50, 55, 60, 65, 70, 75, 80, 85, 90, 95, 100, 120, 140, 160, 180, 200, 220, 240, 260, 280, 300 nm). In some embodiments, pentablock copolymers having a sphere morphology may have a sphere volume fraction. In some embodiments, pentablock copolymers having a core-shell sphere morphology may have core diameters between about 0.5 nm and about 300 nm (e.g., about 0.5, 1, 5, 10, 15, 20, 25, 30, 35, 40, 50, 60, 70, 80, 90, 100, 120, 140, 160, 180, 200, 220, 240, 260, 280, 300 nm). One of skill in the art will appreciate that core diameters can vary depending on the molecular weight and composition of the specific block copolymer. The core diameters may be centered about a mean value plus or minus a couple nanometers, with the breadth of this distribution narrowing with increased annealing time in the melt.

In some embodiments, pentablock copolymers herein may contain at least three polymer blocks according to formula (II):

$$A\text{-}B\text{-}C\text{-}B\text{-}A \qquad (II)$$

wherein A, B, and C are polymer blocks. In some aspects, at least one of A, B, or C is a different polymer block than the other two. In some aspects, A, B, or C are different polymer block than each other.

In some embodiments, polymeric materials herein can include a pentablock copolymer according to formula (II):

$$A\text{-}B\text{-}C\text{-}B\text{-}A \qquad (II)$$

wherein A, B, and C are polymer blocks selected from a polystyrene block, a polydiene block, and a polyalkylene oxide block. In some embodiments, the order of the polymer blocks is random. In some embodiments, the order of the polymer blocks is specific. In some embodiments, A is a polystyrene block; B is a polydiene block; and C is a polyalkylene oxide block. In some embodiments, a polyalkylene oxide block is a poly(ethylene oxide) (PEO) block In some embodiments, a polydiene block is polybutadiene block or a polyisoprene block. In some embodiments, A is a polystyrene block; B is a polybutadiene block; and C is a poly(ethylene oxide) block. In some embodiments, A is a polystyrene block; B is a polyisoprene block; and C is a poly(ethylene oxide) block.

In some embodiments, pentablock copolymers herein may comprise polymer blocks ranging in number average molecular weight (Mn) and/or volume fraction of the final pentablock copolymer. Methods of measuring Mn and/or volume fraction are known in the art and suitable for use herein. In some embodiments, Mn may be determined by proton nuclear magnetic resonance ($^1$H-NMR). In some embodiments, volume fractions (f) may be calculated from monomer weight and polymer densities at a desired temperature. In some aspects, a desired temperate suitable for measuring volume fractions may be about 120° C. to about 150° C.

In some embodiments, pentablock copolymers herein may comprise a polystyrene block having a number average molecular weight ranging from about 4000 Mn to about 80000 Mn. In some aspects, pentablock copolymers herein may comprise a polystyrene block having a number average molecular weight of about 4000 Mn, about 4500 Mn, about 5000 Mn, about 5500 Mn, about 6000 Mn, about 6500 Mn, about 7000 Mn, about 7500 Mn, about 8000 Mn, about 8500 Mn, about 9000 Mn, about 9500 Mn, about 10000 Mn, about 10500 Mn, about 11000 Mn, about 11500 Mn, about 12000 Mn, about 12500 Mn, about 13000 Mn, about 13500 Mn, about 14000 Mn, about 14500 Mn, about 15000 Mn. 15500 Mn, about 16000 Mn, about 16500 Mn, about 17000 Mn, about 17500 Mn, about 18000 Mn, about 18500 Mn, about 19000 Mn, about 19500 Mn, about 20000 Mn, about 25000 Mn, about 25500 Mn, about 30000 Mn, about 35000 Mn, about 40000 Mn, about 45000 Mn, about 50000 Mn, about 55000 Mn, about 60000 Mn, about 65000 Mn, about 70000, about 75000 Mn, or about 80000 Mn. In some aspects, pentablock copolymers herein may comprise a polystyrene block having a number average molecular weight of ranging from about 7500 Mn to about 17500 Mn.

In some embodiments, pentablock copolymers herein may comprise a polystyrene block wherein the volume fraction ranges from about 0.05 f to about 0.8 f. In some aspects, pentablock copolymers herein may comprise a polystyrene block wherein the volume fraction may be about 0.05, about 0.01, about 0.02, about 0.03, about 0.04, about 0.05, about 0.06, about 0.07, about 0.08, about 0.09, about 0.1, about 0.2, about 0.3, about 0.4, about 0.5, about 0.6, about 0.7, or about 0.8 f. In some aspects, pentablock copolymers herein may comprise a polystyrene block wherein the volume fraction may be about 0.05 to about 0.1 f.

In some embodiments, pentablock copolymers herein may comprise a polydiene block having a number average molecular weight ranging from about 1000 Mn to about 100000 Mn. In some embodiments, pentablock copolymers herein may comprise a polydiene block wherein the volume fraction ranges from about 0.01 f to about 0.3 f.

In some embodiments, pentablock copolymers herein may comprise a polybutadiene block having a number average molecular weight ranging from about 1000 Mn to about 100000 Mn. In some aspects, pentablock copolymers herein may comprise a polybutadiene block having a number average molecular weight of about 1000 Mn, about 1500 Mn, about 2000 Mn, about 2500 Mn, about 3000 Mn, about 3500 Mn, about 4000 Mn, about 4500 Mn, about 5000 Mn, about 5500 Mn, about 6000 Mn, about 6500 Mn, about 7000 Mn, about 7500 Mn, about 8000 Mn, about 8500 Mn, about 9000 Mn, about 9500 Mn, about 10000 Mn, about 11000 Mn, about 11500 Mn, about 12000 Mn, about 12500 Mn, about 13000 Mn, about 13500 Mn, about 14000 Mn, about 14500 Mn, about 15000 Mn. 15500 Mn, about 16000 Mn, about 16500 Mn, about 17000 Mn, about 17500 Mn, about 18000 Mn, about 18500 Mn, about 19000 Mn, about 19500 Mn, about 20000 Mn, about 25000 Mn, about 25500 Mn, about 30000 Mn, about 35000 Mn, about 40000 Mn, about 45000 Mn, about 50000 Mn, about 55000 Mn, about 60000 Mn, about 65000 Mn, about 70000, about 75000 Mn, about 80000 Mn, about 85000 Mn, about 90000 Mn, about 95000 Mn, or about 100000 Mn. In some aspects, pentablock copolymers herein may comprise a polybutadiene block having a number average molecular weight of ranging from about 2000 Mn to about 8500 Mn.

In some embodiments, pentablock copolymers herein may comprise a polybutadiene block wherein the volume fraction ranges from about 0.01 f to about 0.3 f. In some aspects, pentablock copolymers herein may comprise a polybutadiene block wherein the volume fraction may be about 0.01, about 0.02, about 0.03, about 0.04, about 0.05, about 0.06, about 0.07, about 0.08, about 0.09, about 0.1, about 0.15, about 0.2, about 0.25, or about 0.3 f. In some aspects, pentablock copolymers herein may comprise a polybutadiene block wherein the volume fraction may be about 0.01 to about 0.05 f.

In some embodiments, pentablock copolymers herein may comprise a polyisoprene block having a number average molecular weight ranging from about 1000 Mn to about 100000 Mn. In some aspects, pentablock copolymers herein may comprise a polyisoprene block having a number average molecular weight of about 1000 Mn, about 1500 Mn, about 2000 Mn, about 2500 Mn, about 3000 Mn, about 3500 Mn, about 4000 Mn, about 4500 Mn, about 5000 Mn, about 5500 Mn, about 6000 Mn, about 6500 Mn, about 7000 Mn, about 7500 Mn, about 8000 Mn, about 8500 Mn, about 9000 Mn, about 9500 Mn or about 10000 Mn, about 11000 Mn, about 11500 Mn, about 12000 Mn, about 12500 Mn, about 13000 Mn, about 13500 Mn, about 14000 Mn, about 14500 Mn, about 15000 Mn. 15500 Mn, about 16000 Mn, about 16500 Mn, about 17000 Mn, about 17500 Mn, about 18000 Mn, about 18500 Mn, about 19000 Mn, about 19500 Mn, about 20000 Mn, about 25000 Mn, about 25500 Mn, about 30000 Mn, about 35000 Mn, about 40000 Mn, about 45000 Mn, about 50000 Mn, about 55000 Mn, about 60000 Mn, about 65000 Mn, about 70000, about 75000 Mn, about 80000 Mn, about 85000 Mn, about 90000 Mn, about 95000 Mn, or about 100000 Mn. In some aspects, pentablock copolymers herein may comprise a polyisoprene block having a number average molecular weight of ranging from about 2000 Mn to about 8500 Mn.

In some embodiments, pentablock copolymers herein may comprise a polyisoprene block wherein the volume fraction ranges from about 0.01 f to about 0.3 f. In some aspects, pentablock copolymers herein may comprise a polyisoprene block wherein the volume fraction may be about 0.01, about 0.02, about 0.03, about 0.04, about 0.05, about 0.06, about 0.07, about 0.08, about 0.09, about 0.1, about 0.2, or about 0.3 f. In some aspects, pentablock copolymers herein may comprise a polyisoprene block wherein the volume fraction may be about 0.01 to about 0.05 f.

In some embodiments, pentablock copolymers herein may comprise a PEO block having a number average molecular weight ranging from about 30,000 Mn to about 800,000 Mn. In some aspects, pentablock copolymers herein may comprise a PEO block having a number average molecular weight of about 30,000 Mn, about 35,000 Mn, about 40,000 Mn, about 45,000 Mn, about 50,000 Mn, about 55,000 Mn, about 60,000 Mn, about 65,000 Mn, about 70,000, about 75000 Mn, about 80000 Mn, about 85000 Mn, about 90000 Mn, about 95000 Mn, about 100000 Mn, about 150000 Mn, about 200,000 Mn, about 250,000 Mn, about 300,000 Mn, about 350,000 Mn, about 400,000 Mn, about 450,000 Mn, about 500,000 Mn, about 550,000 Mn, about 600,000 Mn, about 650,000 Mn, about 700,000 Mn, about 750,000 Mn, or about 800,000 Mn. In some aspects, pentablock copolymers herein may comprise a PEO block having a number average molecular weight of ranging from about 80,000 Mn to about 200,000 Mn.

In some embodiments, pentablock copolymers herein may comprise a PEO block wherein the volume fraction ranges from about 0.6 f to about 0.95 f. In some aspects, pentablock copolymers herein may comprise a PEO block wherein the volume fraction may be about 0.6, about 0.65, about 0.7, about 0.75, about 0.8, about 0.85, about 0.9, or about 0.95 f. In some aspects, pentablock copolymers herein may comprise a PEO block wherein the volume fraction may be about 0.75 to about 0.9 f.

In some embodiments, pentablock copolymers herein may comprise a sphere morphology in the melt with polymer blocks larger than about 100 kDa. In some embodiments, pentablock copolymers herein may comprise a sphere morphology in the melt with polymer blocks ranging from about 100 kDa to about 500 kDa (e.g., about 100, 150, 200, 250, 300, 350, 400, 450, 500 kDa).

In some embodiments, pentablock copolymers herein may comprise a sphere morphology when the volume fraction of C (fc) is larger than the combined volume fraction of A ($f_A$) and B ($f_B$). In some embodiments, pentablock copolymers herein may comprise a sphere morphology when the volume fraction of C (fc) is about 0.75 f to about 0.95 f (e.g., about 0.75, 0.80, 0.85, 0.90, 0.95 f). In some aspects, pentablock copolymers herein may comprise a sphere morphology when the volume fraction of C (fc) is about 0.85 f to about 0.90 f (e.g., about 0.85, 0.86, 0.87, 0.88, 0.89, 0.90 f).

In some embodiments, pentablock copolymers herein may comprise a sphere morphology when the combined volume fraction of A ($f_A$) and B ($f_B$) is about 0.05 f to about 0.4 f (e.g., about 0.05, 0.1, 0.15, 0.2, 0.25, 0.3, 0.35, 0.4 f). In some aspects, pentablock copolymers herein may comprise a sphere morphology when the combined volume fraction of A ($f_A$) and B ($f_B$) is about 0.1 f to about 0.15 f (e.g., about 0.1, 0.11, 0.12, 0.13, 0.14, 0.15 f).

In some embodiments, pentablock copolymers herein may comprise a sphere morphology when the ratio of the volume fraction of A block to B block in the pentablock copolymer ranges from about 1:1 to about 1:10 (e.g., 1:1, 1:2, 1:3, 1:4, 1:5, 1:6, 1:7, 1:8, 1:8, 1:9, 1:10). In some aspects, pentablock copolymers herein may comprise a sphere morphology when the ratio of the volume fraction of A block to B block in the pentablock copolymer is about 1:3.

d) Methods of Making Polymeric Materials

The present invention provides methods of polymeric materials comprising block copolymers. In some embodiments, block copolymers (e.g., triblock copolymers, pentablock copolymers) according to the embodiments presented herein can be made by any suitable method known to produce block copolymers having at least more than one polymer block.

In some embodiments, block copolymers herein may be prepared by anionic polymerization methods. Both polar solvents, such as THF, and non-polar solvents can be employed in anionic polymerization techniques, with the latter type being more common in industrial practice. Examples of non-polar solvents include various C5-C12 cyclic and acyclic alkanes as well as their alkylated derivatives, certain liquid aromatic compounds, and mixtures thereof. The ordinarily skilled artisan is aware of other useful solvents and blends. Most solution-type anionic polymerizations employ an alkyllithium initiator. Non-limiting examples of alkyllithium initiator for use herein can include n-butyllithium, phenyllithium, sec-butyllithium, tert-butyllithium, alkali metal naphthalates, and the like.

In some embodiments, anionic polymerization can be carried out in two or more stages, in each of which the polymer blocks may be polymerized to completion. In some aspects, the order in which the polymer blocks are prepared may be random. In some aspects, the order in which the polymer blocks are prepared may be selective. In some embodiments, anionic polymerization may be two stages, wherein the first stage subjects A polymer block and B polymer block to anionic polymerization to form a macroinitiator, and the second stage subjects the macroinitiator and the C polymer block to anionic polymerization to form a triblock copolymer disclosed herein. In some embodiments, a macroinitiator comprises polystyrene and polybutadiene. In some embodiments, a macroinitiator comprises polystyrene and polyisoprene.

In some embodiments, block copolymers (e.g., triblock copolymers, pentablock copolymers) herein may be prepared by coupling the ends of triblock copolymers herein via coupling reaction. In some embodiments, coupling reactions herein may comprise a coupling agent. Non-limiting examples of coupling agents suitable for use herein can include α,α'-dibromo-p-xylene, and other divalent halogenated alkyl group-containing compounds; isophthalaldehyde, and other divalent aldehyde compounds; isophthaloyl chloride, and other divalent carboxyloyl chloride compounds; cyanuric chloride, and other halogen compounds having 3 or higher valency. In some embodiments, block copolymers herein may be prepared by coupling of the alkoxide chain ends of a triblock copolymers herein using α,α'-Dibromo-p-xylene as a coupling agent.

In some embodiments, hydroxyl-terminated block copolymers (e.g., triblock copolymers, pentablock copolymers) comprising each micellar domain may be exploited. In some aspects, the hydroxyl groups may be activated with leaving groups, such as mesyl or tosyl, or activated with a strong base, such as sodium hydride. In some aspects, the activated hydroxyl groups may then be converted to pairs of orthogonal groups, such as alkynes and azides. In some aspects, these orthogonal groups can react with each other within the polymer, such as in a 1,3-dipolar Huisgen cycloaddition between the azide and alkyne to form a 1,2,3-triazole. The Huisgen cycloaddition is also called the "click reaction." In some aspects, using orthogonal chemistry, excess triblock copolymer could be coupled to form additional pentablock copolymers.

III. Hydrogels

The present disclosure provides for block copolymer hydrogel compositions and methods of making thereof. In some embodiments, for block copolymer hydrogels herein may have any one of the triblock copolymers disclosed herein. In some embodiments, block copolymer hydrogels herein may comprise a blend of triblock copolymers and pentablock copolymers disclosed herein.

In some embodiments, block copolymer hydrogels herein may have a regular structure attained through self-assembly in the melt state, leading to a more homogeneous network formation. This non-solution based thermally processable gel formation can allow hydrogel herein to be shaped before swelling, giving it many industrial advantages of plastics, such as die-casting and coating capabilities. In some embodiments, block copolymer hydrogels herein may have a regular structure attained through solvent-casting. In some embodiments, block copolymer hydrogels herein may be mechanically tunable hydrogels comprised of blends of, sphere-forming amphiphilic block copolymers.

In some embodiments, block copolymer hydrogels herein may comprise at least one triblock copolymer herein and at least one pentablock copolymer herein. In some embodiments, the blending relative amounts of triblock and pentablock polymers may tune the mechanical properties of the gel through a large range.

In some embodiments, block copolymer hydrogels comprising at blend of triblock and pentablock copolymers herein do not form through chemical crosslinkers like conventional brittle hydrogels. Instead, a blend of triblock and pentablock copolymers herein cause a self-assembly of block copolymers into micellar domains in the melt state physically crosslinked the polystyrene cores through the pentablock tethers. In some embodiments, a blend of triblock and pentablock copolymers herein may cause a self-assembly of block copolymers into sphere morphology. In some embodiments, a blend of triblock and pentablock copolymers herein may cause a self-assembly of block copolymers into sphere morphology wherein the core of the sphere may be comprised of A polymer blocks, the shell of the sphere may be comprised of B polymer blocks, and the matrix of the sphere may be comprised of C polymer blocks. In some embodiments, a blend of triblock and pentablock copolymers herein may cause a self-assembly of block copolymers into sphere morphology, the matrix of the sphere may be a body centered cubic lattice. In some aspects, a blend of triblock and pentablock copolymers herein may form a sphere having a matrix, wherein the matrix may be a body centered cubic lattice comprising C polymer blocks.

In some embodiments, block copolymer hydrogels comprising at blend of triblock and pentablock copolymers herein may absorb energy, causing the block copolymer hydrogels to be fatigue resistant. In some embodiments, block copolymer hydrogels comprising at blend of triblock and pentablock copolymers herein may absorb energy at one or more chains that tether the poly(ethylene oxide) polymer block to other polymer blocks in the blend of triblock and pentablock copolymers herein. In some embodiments, the amount of triblock copolymers to the amount of pentablock copolymers may be tunable to control the amount of energy absorbed in block copolymer hydrogels herein. In some embodiments, the amount of triblock copolymers to the amount of pentablock copolymers may be tunable to control the amount of resistance to fatigue in block copolymer hydrogels herein.

In some embodiments, block copolymer hydrogels comprising at blend of triblock and pentablock copolymers herein may dissipate energy, causing the block copolymer hydrogels to be fracture resistant. In some embodiments, block copolymer hydrogels comprising at blend of triblock and pentablock copolymers herein may dissipate energy at the interaction between the B polymer block and liquid medium (e.g., $H_2O$). In some embodiments, the amount of triblock copolymers to the amount of pentablock copolymers may be tunable to control the amount of energy dissipated in block copolymer hydrogels herein. In some embodiments, the relative volume fractions of A, B, and C blocks may be tunable to control the amount of energy dissipated in the block copolymer hydrogels herein. In some embodiments, the relative molecular weights of A, B, and C blocks may be tunable to control the amount of energy dissipated in the block copolymer hydrogels herein. In some embodiments, the chemical composition of A, B, and C blocks may be tunable to control the amount of energy dissipated in the block copolymer hydrogels herein. In some embodiments, the amount of triblock copolymers to the amount of pentablock copolymers may be tunable to control the toughness (i.e., fracture energy).

In some embodiments, block copolymer hydrogels herein may comprise a blend of triblock and pentablock copolymers having a sphere morphology. In some aspects, a blend of triblock and pentablock copolymers herein may form a hydrogel by self-assembly of the block copolymers into spherical domains in the melt state. In some aspects, block copolymer hydrogels herein formed by self-assembly of the block copolymers into spherical domains in the melt state have less fixed junction points compared to a hydrogel formed by crosslinking copolymers.

In some embodiments, block copolymer hydrogels herein may comprise a dry blend of triblock and pentablock copolymers. In some embodiments, the dry blend of triblock and pentablock copolymers may be formed by dissolving the triblock copolymers and pentablock copolymers in an organic solvent and removing the organic solvent. In some embodiments, the molar ratio may be between about 80:20 and about 20:80 triblock/pentablock, such as between about 70:30 and about 20:80 triblock/pentablock. In some embodiments, the triblock/pentablock dry blend may be heated to a temperature between about 100° C. and about 180° C. within the negative mold. In some embodiments, the triblock/pentablock dry blend may be heated under a pressure between about 50 psig and about 800 psig within the negative mold, such as between about 400 psig and about 600 psig within the negative mold. In some embodiments, the triblock/pentablock dry blend may be heated for between about 5 minutes and about 50 minutes within the negative mold. In some embodiments, the triblock/pentablock dry blend is heated to form a triblock/pentablock melt. In some embodiments, the triblock/pentablock melt is allowed to attain ambient temperature to form a triblock/pentablock glass. In some embodiments, the triblock/pentablock glass is contacted with a liquid medium to form a block copolymer hydrogel.

In some embodiments, block copolymer hydrogels herein may comprise a glass formed by self-assembly of the block copolymers herein into spherical domains in the melt state. As used herein, "glass" refers to completely vitrified solids as well as to partially crystalline or glassy solids. Generally, a "glass" is a material below its glass transition temperature (Tg), as defined by for example differential scanning calorimetry (DSC) or dynamic mechanical analysis (DMA).

In some aspects, block copolymer hydrogels herein may comprise a glass formed by self-assembly of the block copolymers herein into spherical domains in the melt state, wherein the volume fraction of the C polymer block is higher than the combined volume fraction of the A and B polymer blocks. In some aspects, block copolymer hydrogels herein may comprise a glass formed by self-assembly of the block copolymers herein into spherical domains in the melt state, wherein the volume fraction of the C polymer block is about 0.85 to about 0.95 (e.g., about 0.85, 0.86, 0.87, 0.88, 0.89, 0.90, 0.91, 0.92, 0.93, 0.94, 0.95). In some aspects, block copolymer hydrogels herein may comprise a glass formed by self-assembly of the block copolymers herein into spherical domains in the melt state, wherein the combined volume fraction of the A and B polymer blocks is about 0.05 to about 0.19 (e.g., about 0.05, 0.1, 0.12, 0.13, 0.14, 0.15, 0.16, 0.17, 0.18, 0.19). In some aspects, block copolymer hydrogels herein may comprise a glass formed by self-assembly of the block copolymers herein into spherical domains in the melt state, wherein the volume fraction of the C polymer block is about 0.85 to about 0.95 (e.g., about 0.85, 0.86, 0.87, 0.88, 0.89, 0.90, 0.91, 0.92, 0.93, 0.94, 0.95) and the combined volume fraction of the A and B polymer blocks is about 0.05 to about 0.19 (e.g., about 0.05, 0.1, 0.12, 0.13, 0.14, 0.15, 0.16, 0.17, 0.18, 0.19).

In some embodiments, block copolymer hydrogels herein may comprise a glass formed from a dry blend comprising a triblock copolymer disclosed herein and a pentablock copolymer disclosed herein in a molar ratio from between about 95:5 and about 1:99 triblock ("tri") to pentablock ("penta") copolymer. In some aspects, a dry blend comprising a triblock copolymer disclosed herein and a pentablock copolymer disclosed herein may have a molar ratio between about 95:5 and about 1:99 tri/penta, such as between about 95:5 and about 90:10 tri/penta, such as between about 90:10 and about 85:15 tri/penta, such as between about 85:15 and about 80:20 tri/penta, such as between about 80:20 and about 75:25 tri/penta, such as between about 75:25 and about 70:30 tri/penta, such as between about 70:30 and about 65:35 tri/penta, between about 65:35 and about 60:40 tri/penta, between about 60:40 and about 55:45 tri/penta, between about 55:45 and about 50:50 tri/penta, between about 50:50 and about 55:45 tri/penta, between about 55:45 and about 45:65 tri/penta, between about 45:65 and about 40:60 tri/penta, between about 40:60 and about 35:65 tri/penta, between about 35:65 and about 30:70 tri/penta, between about 30:70 and about 25:75 tri/penta between about 25:75 and about 20:80 tri/penta, between about 20:80 and about 15:85 tri/penta, between about 15:85 and about 10:90 tri/penta, between about 10:90 and about 5:95 tri/penta, or between about 5:95 and about 1:99 tri/penta. In particular, the molar ratio may between about 70:30 and about 20:80 tri/penta, between about 60:40 and about 30:70 tri/penta, or at about 40:60 tri/penta. The molar ratio may also be about 4:96 tri/penta, about 3:97 tri/penta, about 2:98 tri/penta, or about 1:99 tri/penta. In some embodiments, block copolymer hydrogels described herein may comprise a glass formed from a dry blend comprising a triblock copolymer having formula (I) and a pentablock copolymer having formula (II) in a molar ratio from between about 95:5 and about 1:99 triblock to pentablock copolymer.

In some embodiments, a dry blend comprising a triblock copolymer disclosed herein and a pentablock copolymer disclosed herein may be processed under a combination of pressure and heat for a period of time to form a glass. The dry blend comprising a triblock copolymer disclosed herein and a pentablock copolymer disclosed herein may be heated to a temperature between about 100° C. and about 180° C., such as between about 100° C. and about 110° C., between about 110° C. and about 120° C., between about 120° C. and about 130° C., between about 130° C. and about 140° C., between about 140° C. and about 150° C., between about 150° C. and about 160° C., between about 160° C. and about 170° C., or between about 170° C. and about 180° C. The temperature may be between about 140° C. and about 160° C., such as about 150° C.

The dry blend comprising a triblock copolymer disclosed herein and a pentablock copolymer disclosed herein may be heated without or without pressure. If heated under pressure, the triblock-pentablock copolymer dry blend may be heated under a pressure between about 50 psig and about 800 psig, such as between about 50 psig and about 100 psig, between about 100 psig and about 150 psig, between about 150 psig and about 200 psig, between about 200 psig and about 250 psig, between about 250 psig and about 300 psig, between about 300 psig and about 350 psig, between about 350 psig and about 400 psig, between about 400 psig and about 450 psig, between about 450 psig and about 500 psig, between about 500 psig and about 550 psig, between about 550 psig and about 600 psig, between about 600 psig and about 650 psig, between about 650 psig and about 700 psig, between about 700 psig and about 750 psig, or between about 750 psig and about 800 psig. In particular, the pressure may be between about 200 psig and about 600 psig, or at about 500 psig.

Additionally, pressure may be applied to samples of the triblock-pentablock copolymer dry blend placed in a vacuum bag, such that a dynamic reduced pressure of less than 20 Torr inside the bag is achieved during heating. That is, the sample may be placed into a vacuum bag during operation of the press used to heat and squeeze the sample. Doing so has been discovered herein to reduce the number of microbubbles, as well as grain boundary and particle sintering defects in the melt.

In some embodiments, a triblock-pentablock copolymer dry blend herein may be heated for between about 5 minutes and about 50 minutes, such as between about 5 minutes and about 10 minutes, between about 10 minutes and about 15 minutes, between about 15 minutes and about 20 minutes, between about 20 minutes and about 25 minutes, between about 25 minutes and about 30 minutes, between about 30 minutes and about 35 minutes, between about 35 minutes and about 40 minutes, between about 40 minutes and about 45 minutes, or between about 5 minutes and about 50 minutes. In some aspects, a triblock-pentablock copolymer dry blend herein may be heated for about 25 minutes, or for about 5 minutes.

The heating may occur in heating-cooling cycles, wherein the triblock-pentablock copolymer dry blend may be heated for a period of time and then allowed to cool to ambient temperature before re-heating. For example, the triblock-pentablock copolymer dry blend may be heated for a period of 5 minutes and then allowed to cool to ambient temperature before reheating. Generally, the triblock-pentablock copolymer dry blend may pass through 1 to 10 cycles. Any combination of these features may be used for processing the triblock-pentablock copolymer dry blend. For example, the triblock-pentablock copolymer dry blend may be heated at 150° C. at 500 psig in a vacuum bag for 4 heating-cooling cycles. As used herein "ambient temperature" is the temperature of the environment surrounding the process or experimental apparatus.

In some embodiments, block copolymer hydrogels herein may further comprise liquid medium. In some embodiments, triblock-pentablock copolymer glass formed as described herein, may be contacted with a liquid medium to form a block copolymer hydrogel. In some embodiments, a liquid medium for use herein may be an aqueous medium. In some aspects, an aqueous medium may be water, a buffer, such as phosphate-buffered saline (PBS) or Ringer's solution, or the like. In some embodiments, the aqueous medium may be buffer. In other embodiments, the aqueous medium may be water. In some embodiments a glass formed from a triblock-pentablock copolymer dry blend herein may be contacted with a liquid medium to form a block copolymer hydrogel. The liquid medium may be an aqueous medium, a room-temperature ionic liquid (RTIL), a dialkylcarbonate, an alkylenecarbonate, or combinations thereof. For example, any liquid medium described herein may be used.

In some embodiments a glass formed from a triblock-pentablock copolymer dry blend herein may be contacted with the liquid medium at a temperature above 0° C. and below about 160° C., such as above 0° C. and below about 20° C., or at about 10° C. The temperature may be between about 0° C. and about 5° C., between about 5° C. and about 10° C., between about 10° C. and about 15° C., between about 15° C. and about 20° C., between about 20° C. and about 25° C., between about 25° C. and about 30° C., between about 30° C. and about 35° C., between about 35° C. and about 40° C., between about 40° C. and about 45° C., between about 45° C. and about 50° C., between about 50° C. and about 55° C., between about 55° C. and about 60° C., between about 60° C. and about 65° C., between about 65° C. and about 70° C., between about 70° C. and about 75° C., between about 75° C. and about 80° C., between about 80° C. and about 85° C., between about 85° C. and about 90° C., between about 90° C. and about 95° C., between about 95° C. and about 100° C., between about 100° C. and about 105° C., between about 105° C. and about 110° C., between about 110° C. and about 115° C., between about 115° C. and about 120° C., between about 120° C. and about 125° C., between about 125° C. and about 130° C., between about 130° C. and about 135° C., between about 135° C. and about 140° C., between about 140° C. and about 145° C., between about 145° C. and about 150° C., between about 150° C. and about 155° C., or between about 155° C. and about 160° C.

In some embodiments a glass formed from a triblock-pentablock copolymer dry blend herein may be contacted with the aqueous medium at a temperature above 0° C. and below about 100° C., such as above 0° C. and below about 20° C., at about 10° C. The temperature may be between about 0° C. and about 5° C., between about 5° C. and about 10° C., between about 10° C. and about 15° C., between about 15° C. and about 20° C., between about 20° C. and about 25° C., between about 25° C. and about 30° C., between about 30° C. and about 35° C., between about 35° C. and about 40° C., between about 40° C. and about 45° C., between about 45° C. and about 50° C., between about 50° C. and about 55° C., between about 55° C. and about 60° C., between about 60° C. and about 65° C., between about 65° C. and about 70° C., between about 70° C. and about 75° C., between about 75° C. and about 80° C., between about 80° C. and about 85° C., between about 85° C. and about 90° C., between about 90° C. and about 95° C., or between about 95° C. and about 100° C.

In some embodiments, after swelling, a block copolymer hydrogel herein may have a concentration of liquid medium between about 32:1 and 2:1 liquid medium/triblock-pentablock copolymer blend by weight, such as between about 32:1 to 30:1 liquid medium/triblock-pentablock copolymer blend by weight, between about 30:1 to 28:1 water/triblock-pentablock copolymer blend by weight, between about 28:1 to 26:1 liquid medium/triblock-pentablock copolymer blend by weight, between about 26:1 to 24:1 liquid medium/triblock-pentablock copolymer blend by weight, between about 24:1 to 22:1 liquid medium/triblock-pentablock copolymer blend by weight, between about 22:1 to 20:1 liquid medium/triblock-pentablock copolymer blend by weight, between about 20:1 to 18:1 liquid medium/triblock-pentablock copolymer blend by weight, between about 18:1 to 16:1 liquid medium/triblock-pentablock copolymer blend by weight, between about 16:1 to 14:1 liquid medium/triblock-pentablock copolymer blend by weight, between about 14:1 to 12:1 liquid medium/triblock-pentablock copolymer blend by weight, between about 12:1 to 10:1 liquid medium/triblock-pentablock copolymer blend by weight, between about 10:1 to 8:1 liquid medium/triblock-pentablock copolymer blend by weight, between about 8:1 to 6:1 liquid medium/triblock-pentablock copolymer blend by weight, between about 6:1 to 4:1 liquid medium/triblock-pentablock copolymer blend by weight, or between about 4:1 to 2:1 liquid medium/triblock-pentablock copolymer blend by weight. The liquid concentration of the hydrogel may be between about 20:1 and 4:1 liquid medium/triblock-pentablock copolymer blend by weight.

In some embodiments, block copolymer hydrogels herein may have a high resistance to fatigue. In some embodiments, block copolymer hydrogels herein may have a fatigue resistance to at least 500,000 compression cycles, such as at least 600,000 compression cycles, such as at least 700,000 compression cycles, such as at least 800,000 compression cycles, such as at least 900,000 compression cycles, such as at least 1,000,000 compression cycles, such as at least 1,500,000 compression cycles, such as at least 2,000,000 compression cycles, such as at least 2,500,000 compression cycles, such as at least 3,000,000 compression cycles, such as at least 3,500,000 compression cycles, such as at least 4,000,000 compression cycles, such as at least 4,500,000 compression cycles, such as at least 5,000,000 compression cycles, or such as at least 10,000,000 compression cycles. In counting the number of compression cycles, the cycles are preferably continuous, but need not be so, having a resting period between shorter runs of cycles.

In some embodiments, block copolymer hydrogels herein may have rapid recovery time. As used herein, "rapid recovery" hydrogels refer to hydrogels where upon the removal of the mechanical shear force, the original gel recovers within about 30 minutes to about 1 second. In some embodiments, block copolymer hydrogels herein can recover within about 5 to about 1 seconds (e.g., about 5, 4, 3, 2, 1) after removal of the mechanical shear force. In some embodiments, In some embodiments, block copolymer hydrogels herein can recover within about 5 to about 1 seconds (e.g., about 5, 4, 3, 2, 1) after removal of the mechanical shear force wherein the mechanical shear force has been introduced and removed more than one time. In some embodiments, In some embodiments, block copolymer hydrogels herein can recover within about 5 to about 1 seconds (e.g., about 5, 4, 3, 2, 1) after removal of the mechanical shear force wherein the mechanical shear force has been introduced and removed at least about 500,000 times.

The compression cycles may operate with at least 12% compression at a frequency of about 1 Hz, particularly wherein the compression cycles operate with 50% compression at least every eleventh cycle. The fatigue resistance is characterized by a modulus recoverable to at least 80% of its value before the compression cycles were run, such as to at least 90%, to at least 92%, to at least 95% or to at least 98% of its value before the compression cycles were run.

In some embodiments, block copolymer hydrogels herein may have a high resistance to fracture. Tensile test can serve as an indicator of fracture resistance in a hydrogel. In some embodiments, block copolymer hydrogels herein may have a tensile modulus ranging between about 0.001 MPa and about 140 MPa, such as between about 0.001 MPa and about 0.5 MPa, about 0.5 MPa and about 1 MPa, between about 1 MPa and about 2 MPa, between about 2 MPa and about 3 MPa, between about 3 MPa and about 4 MPa, between about 4 MPa and about 5 MPa, between about 5 MPa and about 6 MPa, between about 6 MPa and about 7 MPa, between about 7 MPa and about 8 MPa, between about 8 MPa and about 9 MPa, between about 9 MPa and about 10 MPa, between about 10 MPa and about 20 MPa, between about 20 MPa and about 30 MPa, between about 30 MPa and about 40 MPa, between about 40 MPa and about 50 MPa, between about 50 MPa and about 60 MPa, between about 60 MPa and about 70 MPa, between about 70 MPa and about 80 MPa, between about 80 MPa and about 90 MPa, between about 90 MPa and about 100 MPa, between about 100 MPa and about 110 MPa, between about 110 MPa and about 120 MPa, between about 120 MPa and about 130 MPa, or between about 130 MPa and about 140 MPa. The tensile modulus may be greater than about 0.5 MPa. The tensile modulus may be less than about 140 MPa.

In some embodiments, block copolymer hydrogels herein are highly stable. In some aspects, hydrogels herein are stable for about 12 hours, about 24 hours, about 2 days, about 4 days, about 1 week, about 4 weeks, about 3 months, about 6 months, or about 1 year. In some aspects, hydrogels herein do not degrade. In some embodiments, block copolymer hydrogels herein are highly stable at temperatures ranging from about 0° C. to about 100° C. (e.g., about 0, 10, 20, 30, 40, 50, 60, 70, 80, 90, 100° C.). In some embodiments, block copolymer hydrogels herein are highly stable at temperatures ranging from about 0° C. to about 100° C.

for about 12 hours, about 24 hours, about 2 days, about 4 days, about 1 week, about 4 weeks, about 3 months, about 6 months, or about 1 year.

In some embodiments, block copolymer hydrogels herein may further comprise an active pharmaceutical ingredients, such as a drug, a biological factor, therapeutic agent, or pharmaceutic agent. In some embodiments, block copolymer hydrogels herein may be formed into a soft tissue mimetic, as described herein, providing an implantable medical device, or they may coat the surface of a medical device.

IV. Applications

In some embodiments, block copolymer hydrogels herein may have one or more applications. Non-limiting examples of applications suitable for use herein can include hydrated adhesives, coating materials, elastic separation membranes (such as for light gases, protein assemblies, and biologics), medical devices (such as soft tissue mimetics), coatings on medical devices, and mechanical energy absorbers (such that found in footwear, sportswear, helmets and other protective gear, and sports equipment). In some aspects, block copolymer hydrogels herein may be used as separators in battery cells or fuel cells.

In some embodiments, block copolymer hydrogels herein may be used as elastic separation membranes for light gases, such as mixtures of carbon dioxide ($CO_2$), methane ($CH_4$), ethane, propane, butane, water, oxygen ($O_2$), nitrogen and argon. The mixture of light gases may be crude natural gas (such as that produced at a natural gas well), flue gas, or atmosphere. In particular, $CO_2$ is emitted from coal-fired power plants in "flue gas," which contains 10-15% $CO_2$ along with $N_2$ (70-80%), water, $O_2$, and other trace gases.

In some embodiments, block copolymer hydrogels herein may be used to make separators in battery cells or fuel cells. The battery separator is a critical component in liquid electrolyte batteries and is placed between the positive electrode and the negative electrode to prevent physical contact of the electrodes while enabling free ionic transport and isolating electronic flow. Generally, a battery separator is a microporous layer consisting of either a polymeric membrane or a non-woven fabric mat. The battery separators described herein are chemically and electrochemically stable towards the electrolyte and electrode materials under ordinary battery operation. These battery separators are also mechanically strong enough to withstand the high tension during the battery assembly operation.

In some embodiments, block copolymer hydrogels herein may have utility in biological and medical applications. Non-limiting examples of biological and medical applications can include wound healing, reconstructive surgery, soft tissue repair and/or replacement, cosmetics, and the like. In some embodiments, block copolymer hydrogels herein may be used in a soft tissue mimetic composition. "Soft tissue" includes tendons, ligaments, fascia, skin, fibrous tissues (such as fibrocartilage), fat, and synovial membranes (which are connective tissue), and muscles, nerves and blood vessels (which are not connective tissue). A "soft tissue mimetic" is an artificial material which mimics the behavior a natural soft tissue. The mimics should exhibit in-vivo mechanical anisotropy, biocompatibility, antifouling, and lubricity. In some aspects, block copolymer hydrogels herein be used in a knee meniscus replacement composition. In some aspects, block copolymer hydrogels herein be used in ocular compositions such as, but not limited to ocular implants, contact lenses, and the like.

In some embodiments, block copolymer hydrogels described herein may be used for scaffolding materials or delivery vehicles for small-molecule, protein-based, antibody-based, anti-microbial-based, and/or cell-based therapies. In some embodiments, hydrogels described herein may include stem cells. Non-limiting examples of stem cells suitable for use herein can include embryonic stem cells, induced pluripotent stem cells, hematopoietic stem cells, neural stem cells, epithelial stem cells, skin stem cells, and mesenchymal stem cells or mesenchymal stromal cells.

In some embodiments, block copolymer hydrogels disclosed herein may further include at least one active agent. In some embodiments, an active agent may include, but is not limited to, any substance or combination of substances, intended to furnish a biological activity or to otherwise have direct effect in the diagnosis, cure, mitigation, treatment or prevention of disease, or to have direct effect in restoring, correcting or modifying physiological functions in a subject. In some aspects, an active agent for use herein may be small molecule, a peptide, a polynucleotide, a genetically modified cell or an antibody, an antibody fragment or a combination thereof. In other embodiments, a hydrogel disclosed herein may include an active agent or can release an active agent at the time of injection, immediately after injection, at a constant rate for the duration of the degradation of the hydrogel after injection, once the hydrogel completely degrades after injection, or a combination thereof.

In some embodiments, block copolymer hydrogels described herein may be used for treating or preventing a condition in a subject. One of skill in the art will appreciate that hydrogels can be used in a variety of ways to treat or prevent a condition in a subject and may be optimized depending on the condition, the severity of symptoms associated with the condition, and the clinical profile of the subject having or suspected of having the condition. Non-limiting examples of conditions suitable for use of hydrogels herein include inflammatory diseases, autoimmune diseases, vascular diseases, orthopedic diseases, cancer, and the like.

In other embodiments, kits are provided for making or using polymeric materials and/or block copolymer hydrogels as disclosed herein. In some embodiments, kits for use as described herein can include one or more containers further including a composition (e.g., hydrogels) or agents for creating a hydrogel as described herein. In some embodiments, kits herein may include instructions for use of hydrogels in any of the methods described herein and/or instructions on how to prepare hydrogels from the polymeric materials described herein.

EXAMPLES

The following examples are included to demonstrate various embodiments of the present disclosure. It should be appreciated by those of skill in the art that the techniques disclosed in the examples that follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the spirit and scope of the invention.

Example 1. Anionic Polymerization of PS-PB-OH and PS-PI-OH

In accordance with the present disclosure, PS-PB-OH and PS-PI-OH were synthesized by anionic polymerization. In brief, styrene monomer purified by vacuum distilled from dried dibutylmagnesium was added under argon to a vigorously stirring solution of sec-butyl lithium and dry, air-free cyclohexane in a 1 liter (L) reaction vessel. The temperature of the reaction mixture was raised to 40° C. and stirring continued for approximately 8 hours. At this point, the reactor pressure was reduced to approximately 1 pounds per square in gauge (psig). 1,3-butadiene or isoprene purified by vacuum distillation from n-butyl lithium was added to the reaction vessel slowly to ensure pressure did not rise above 10 psig. The reaction was maintained at 40° C. for 8 hours. At this time, ethylene oxide was added to the reactor and allowed to react for 24 hours. The reaction was terminated by direct addition of acidic methanol. The polymer was rotovapped and precipitated in a 1:3 mixture of isopropanol and methanol (2 L total) to give a white solid. The polymer was dried under vacuum at room temperature for 48 hours.

Example 2. Anionic Polymerization of PS-PB-PEO-OH

In accordance with the present disclosure, PS-PB-PEO-OH was synthesized by anionic polymerization. In brief, PS-PB-OH or PS-PI-OH (1 gram (g)) was dried overnight under vacuum in a 1 L reaction vessel with a new Teflon stirbar. The reactor was evacuated and backfilled with purified argon before the addition of approximately 1 L of dry, air-free tetrahydrofuran (THF). Concentrated potassium naphthalenide in THF was added to the polymer solution via cannula until a light green color persisted for at least 20 minutes. The temperature of the reaction mixture was raised to 40° C. and ethylene oxide was added under argon with vigorous stirring. Stirring was continued for approximately 24 hours. The reaction was terminated by direct addition of acidic methanol. The polymer was rotovapped and precipitated in pentane to give a light purple solid. The polymer was dried under vacuum at room temperature for 48 hours. The AB macroinitiators were terminated with a single hydroxide from which poly(ethylene oxide) was grown by a second anionic polymerization. For PEO growth larger than 100 kDa, a 50% stoichiometric excess of ethylene oxide was used. The synthesis of a separate macroinitiator allowed synthesis of several ABC block polymers with different PEO volume fractions from a single AB macroinitiator. Number-average molecular weight (Mn) of the macroinitiators and the final ABC polymers was determined using end-group analysis from 1H-NMR. In brief, 1H-NMR spectra were collected at room temperature in CDCl3 on a Bruker NEG400 MHz spectrometer with Prodigy™ BBFO Probe (n=128, delay=10 sec, acquisition time=2.5 sec).

Example 3. Synthesis and Analysis of Block Polymers

In accordance with the present disclosure, eleven PS-PI-PEO and PS-PB-PEO ABC triblock polymers were synthesized to investigate sphere morphology formation in highly asymmetric ABC systems (Table 1). Macroinitiators of PS-PI-OH and PS-PB-OH were synthesized by anionic polymerization as described herein. Polybutadiene was initially used, but the ease of handling liquid monomer and the elimination of special safety considerations associated with purification and use of gaseous monomers made isoprene a more attractive diene for these investigations. Because both PI and PB are diene-based polymers, their phase behaviors may be comparable. The AB macroinitiators were terminated with a single hydroxide from which poly(ethylene oxide) was grown by a second anionic polymerization. The synthesis of a separate macroinitiator allowed synthesis of several ABC block polymers with different PEO volume fractions from a single AB macroinitiator.

TABLE 1

Polymers synthesized by anionic polymerization

| Polymer | S Mn | B/I Mn | O Mn | $f_s$ | $f_{B/I}$ | $f_o$ | Phase |
|---|---|---|---|---|---|---|---|
| SB-1 | 10400 | 8000 | 0 | 0.562 | 0.438 | 0 | — |
| SBO-Ia | 10400 | 8300 | 80100 | 0.111 | 0.105 | 0.784 | Cylinders |
| SB-2 | 12200 | 5100 | 0 | 0.668 | 0.33 | 0 | — |
| SBO-2a | 12200 | 4800 | 102000 | 0.110 | 0.051 | 0.839 | Cylinders |
| SB0-2b | 12200 | 5600 | 132600 | 0.087 | 0.047 | 0.866 | Cylinders |
| SI-3 | 8500 | 6400 | 0 | 0.532 | 0.46: | 0 | — |
| SIO-3a | 8500 | 6100 | 39200 | 0.166 | 0.139 | 0.695 | HPC |
| SIO-3b | 8500 | 6300 | 85100 | 0.091 | 0.079 | 0.829 | Cylinders |
| SI-4 | 7700 | 2100 | 0 | 0.761 | 0.239 | 0 | — |
| SIO-4a | 7700 | 2000 | 77000 | 0.096 | 0.030 | 0.875 | BCC Spheres |
| SIO-4b | 7700 | 2100 | 43600 | 0.153 | 0.053 | 0.794 | HPC |
| SI-5 | 10200 | 2800 | 0 | 0.760 | 0.241 | 0 | — |
| SIO-5a | 10200 | 2800 | 102300 | 0.096 | 0.031 | 0.874 | LLP Spheres |
| SIO-5b | 10200 | 2900 | 115000 | 0.086 | 0.029 | 0.885 | LLP Spheres |
| SIO-5c | 10200 | 2900 | 183200 | 0.057 | 0.019 | 0.924 | LLP Spheres→Disorder |

S = polystyrene, B = polybutadiene, I = polyisoprene, and O = poly(ethylene oxide). Mn is number average molecular weight and was determined by $^1$H-NMR. Volume fractions calculated from reported polymer densities at 140° C.

The monomer weight and polymer density[20] at 125° C. was used to calculate and target PS to PI volume fractions of 3:1, 2:1, and 1:1. These volume fractions were chosen because computational phase diagrams exhibited a larger sphere phase region with progressively smaller volume fractions of the B block.[14] The PEO volume fractions were chosen to mimic the B block volume fractions of A block sphere formation in AB diblock copolymers where $f_B$=0.87-0.92. Within this volume fraction region, two morphologies were identified: cylinders and spheres.

The morphologies of the polymers were determined by Small Angle X-ray Scattering (SAXS). In brief, all resulting polymers were prepared for processing by SAXS as follows. Polymer was placed into an 8 mm×1 mm round mold between two pieces of Teflon coated Kapton sheets. The discs were then held (Carver Press) under a constant pressure of 500 psi at 150° C. for approximately 10 minutes until no bubbles could be seen in the polymer melt. Once polymers were prepared, SAXS data were collected on a Rigaku S-Max 3000 High Brilliance 3 Pinhole SAXS system outfitted with a MicroMax-007HFM Rotating Anode (CuKa), Confocal Max-Flux™ Optic, Gabriel Multiwire Area Detector and a Linkam thermal stage. Samples were subjected to a heating cycle from 100° C. to 250° C. and annealed for 1 hour with 10-minute (min) acquisition times every 50° C. If no changes in the scattering profile were observed, the sample was allowed to continue annealing for up to 12 hours. The sample was then cooled back to 100° C. with 10 min acquisition times every 50° C. The crystallization of PEO below 70° C. disrupted the polymer morphology, so it was not useful to characterize the polymers below 75° C. All samples were subjected to a heating and cooling cycle in the SAXS up to 250° C.

The morphologies of the polymers were also determined by rheology. In brief, to process polymers for rheology, a polymer was placed into an 25 mm×1 mm round mold between two pieces of Teflon coated Kapton sheets. The discs were then held under a constant pressure on a Carver Press of 500 psi at 150° C. for approximately 10 minutes until no bubbles could be seen in the polymer melt. The processed polymers were then subjected to rheological tests. Rheological tests were performed on a TA Instruments ARES rheometer with 25 mm parallel plates. Dynamic mechanical spectroscopy were performed for each sample using a 1-3.5% shear strain (verified linear viscoelastic region) and with 1% frequency from 100° C. to 250° C. with two heating and one cooling cycle at 1° C./sec. Dynamic frequency sweeps (oscillatory shear) were performed for each sample using a 1-3.5% shear strain (verified linear viscoelastic region) over a frequency range of 0.1 to 100 radians per second (rad/s).

The synthetic challenges that accompany making enough polymers to adequately study the phase region should not be understated. In order to target increasingly larger volume fractions of the PEO block, a larger molecular weight of PEO was needed. A 0.1 increase in PEO volume fraction at the upper end of the expected spheres region corresponded to larger than a 15 kDa increase in PEO molecular weight and a range of PEO molecular weights from 77 kDa to 180 kDa over the range of the sphere region depending on the molecular weight of the A and B blocks. These large molecular weights of PEO can be difficult to achieve. As the kinetics of anionic polymerization decrease over time, the polymer could be left to grow for days, breakdown of the polyisoprene and polybutadiene macroinitiators has been observed when the reaction was left longer than 24 hours. It is possible to synthesize these long chains by adding a stoichiometric excess of EO, but the exact excess needed to target a specific molecular weight was not yet well understood. While the molecular weight of the PS-PI macroinitiator could be decreased to reduce the length of PEO that is needed, the goal mechanical function of these sphere-forming polymers relies on a large molecular weight especially in the PS block. The use of anionic polymerization ensured that, despite the large molecular weights, the dispersity of the AB and ABC block copolymers was less than 1.1 (FIG. 1).

Cylinder Formation: Three SBO and three SIO polymers were characterized as forming cylinder structures. Polymers that form cylinder structures are useful in showing where the boundaries of the sphere-forming region exist. Two of the cylinders ordered into hexagonally-packed cylinders-SIO-3a and SIO-4b. During a temperature ramp in the SAXS, SIO-3a did not become well-ordered hexagonally-packed cylinders until after a one hour anneal at 250° C. SIO-3a observed scattering corresponding to the $\sqrt{1}$, $\sqrt{3}$, $\sqrt{4}$, $\sqrt{7}$, $\sqrt{9}$, and $\sqrt{12}$ reflections (FIG. 2A). The scattering profile at 150° C. of SIO-3a before annealing contains the initial q* peak, a drop almost to baseline, then a slight peak followed by a peak ⅓ intensity of the primary followed by a broad peak only slightly above baseline. Once annealed, the shoulder on the primary peak becomes the $\sqrt{3}$ peak, the largest intensity peak splits into the $\sqrt{4}$, $\sqrt{7}$, and $\sqrt{9}$ peaks with the $\sqrt{4}$ peak having the highest intensity and the broad peak resolves into the $\sqrt{12}$ and $\sqrt{13}$ peaks. The other cylinders-forming samples have a similar profile to SIO-3a before heating with the initial q* peak, a broad shoulder on the primary peak, a drop almost to baseline, then a peak of ⅓ intensity of the primary followed by a broad peak only slightly above baseline. The appearance of these peaks from a scattering profile that does not contain higher order peaks suggests that SIO-3a formed unordered cylinders in the melt which then ordered into the hexagonally-packed formation. This change in ordering is observed in the DMS (FIG. 2B) in the hysteresis between the heating and cooling cycles from 100° C. to 200° C.

Figure 3A:
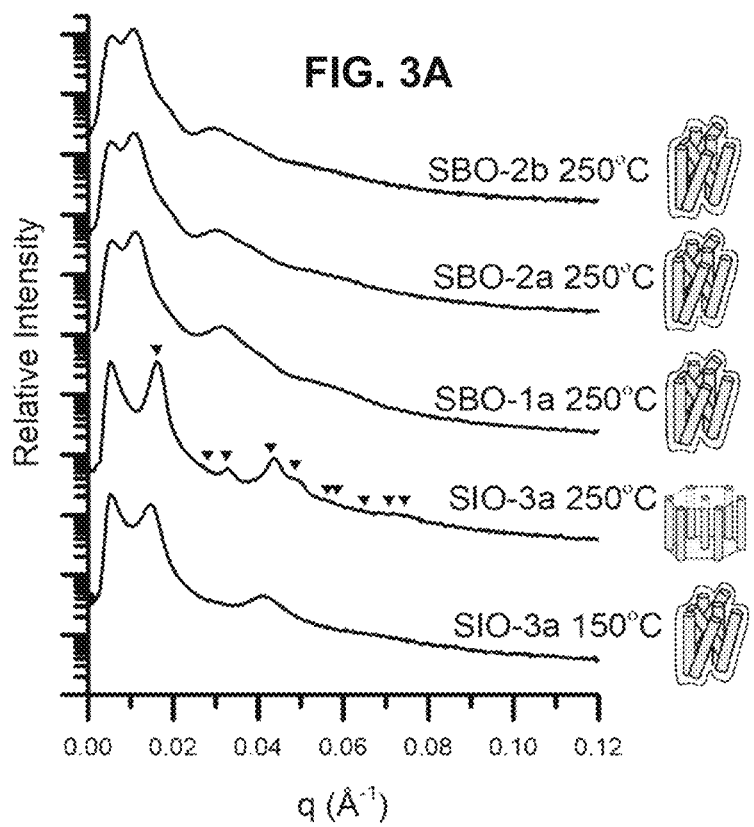
FIG. 3A depicts a SAXS analysis of all cylinder-forming samples in accordance with the present disclosure. At higher molecular weights, heating to 250° C. did not result in the periodic ordering shown by the SBO-3a. However, the higher order peaks of the higher molecular weight samples did correlate with the scattering profile of SBO-3a when it was disordered cylinders.
Figure 3B:
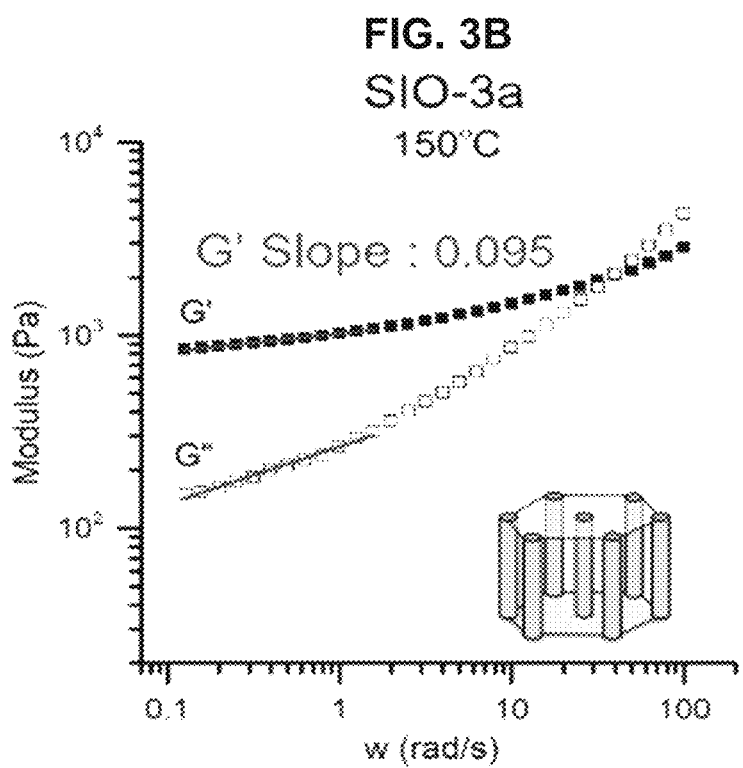
Figure 3C:
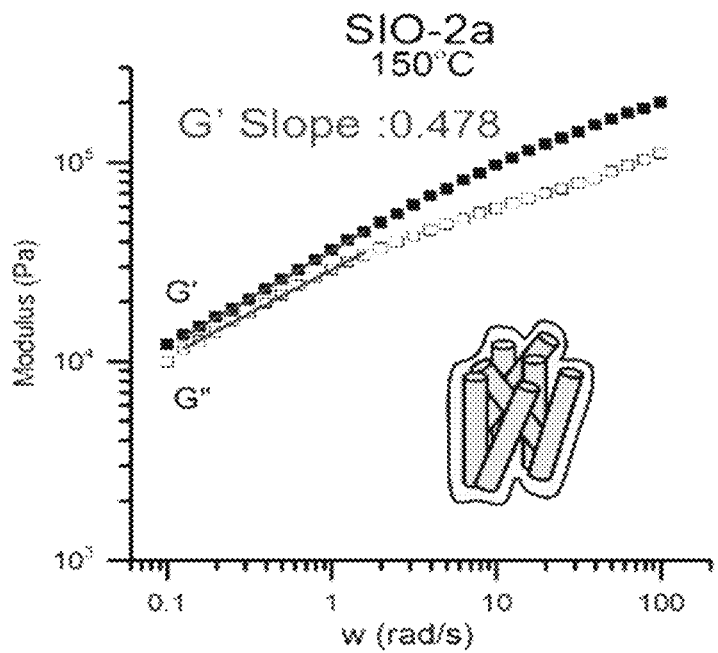
Figure 3D:
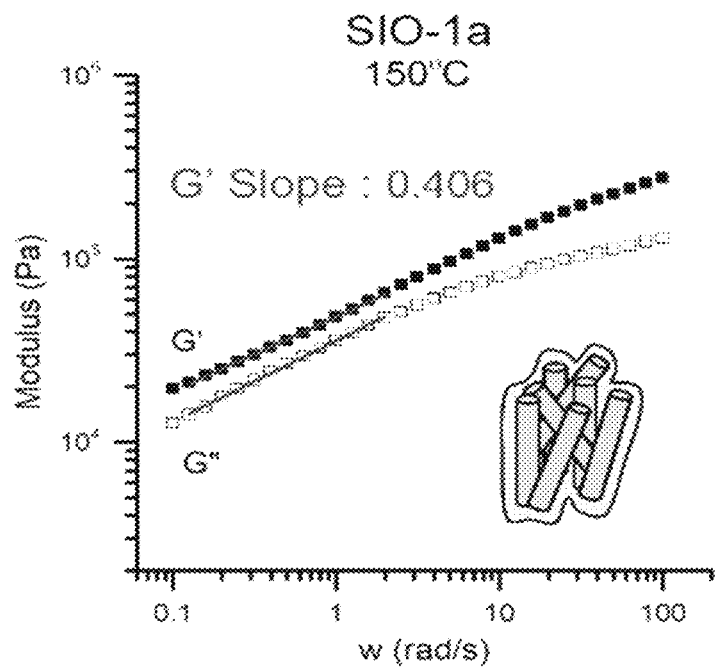

The determination of the four polymers that did not form a well-ordered HPC structure was done by comparing their SAXS profiles to the scattering profile of SIO-3a before and after ordering (FIG. 3A). Even after a 12 hour anneal at 250° C., SBO-1a, SBO-2a, SBO-2b, and SBO-3b did exhibit well-defined peaks in their scattering profiles. However, the presence of a primary scattering peak and multiple higher order peaks does show that there is phase separation in the sample. The scattering profiles of these samples are similar and match the profile of the unordered cylinders observed in SIO-3a. The scattering profiles contain the initial q* peak, a drop almost to baseline, then a slight peak followed by a peak ⅓ intensity of the primary followed by a broad peak only slightly above baseline. Frequency sweeps for SIO-1a, SIO-2a, and SIO-2b show the slope of the modulus at low frequency to be close to ⅓ which corresponds with a cylindrical morphology (FIGS. 3B-3E).

Figure 5A:
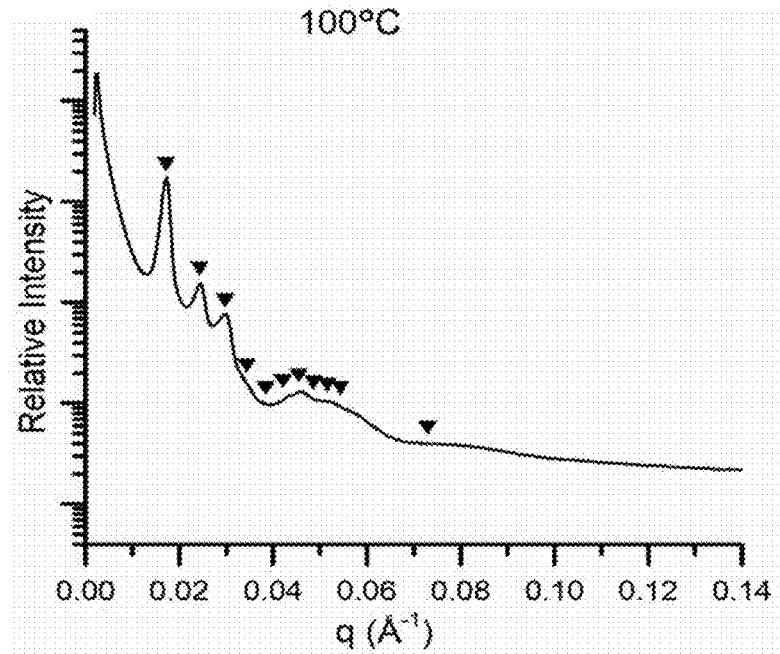
FIG. 5A depicts a representative image of a synchrotron of high-temperature annealed SIO-4a at 100° C. in accordance with the present disclosure.
Figure 5B:
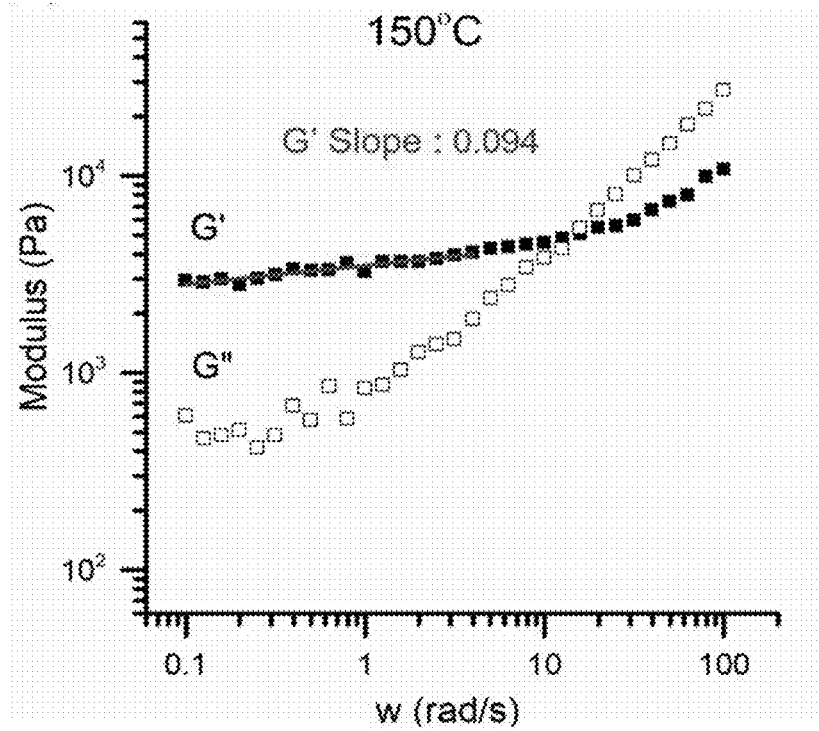
FIG. 5B depicts a representative image of a frequency sweep of SIO-4a at 150° C. in accordance with the present disclosure. The frequency sweep showed the change of the modulus flattening towards 0 at low frequencies which points to the sphere morphology.

Sphere Formation: Four polymers were characterized as a sphere morphology. SIO-4a formed a body-centered cubic structure and SIO-5a, 5b, and 5c phase separate into a liquid-like packing of spheres. The morphology of SIO-4a was determined directly based on SAXS diffraction peaks. The formation of the BCC structure required a temperature ramp and anneal. At temperatures below 200° C., the principal scattering peak and multiple higher order peaks were visible (FIG. 4A). After a 2 hour anneal at 250° C., these peaks became more resolved (FIG. 4A) corresponding to the $\sqrt{2}$, $\sqrt{4}$, $\sqrt{6}$, and $\sqrt{8}$ reflections expected for the BCC morphology. This morphology was maintained after cooling. DMS was performed on this sample (FIG. 4B). The flattening of the cooling cycle corresponds to the formation of a triply periodic structure after heating to 250° C. Synchrotron SAXS of SIO-4a after annealing at 250° C. confirmed the periodic structure of the BCC structure as multiple higher order peaks were able to be resolved (FIG. 5A). A frequency sweep of SIO-4a showed the flattening of the slope of the elastic modulus toward zero further confirming the formation of the triply periodic BCC structure.

Figure 6B:
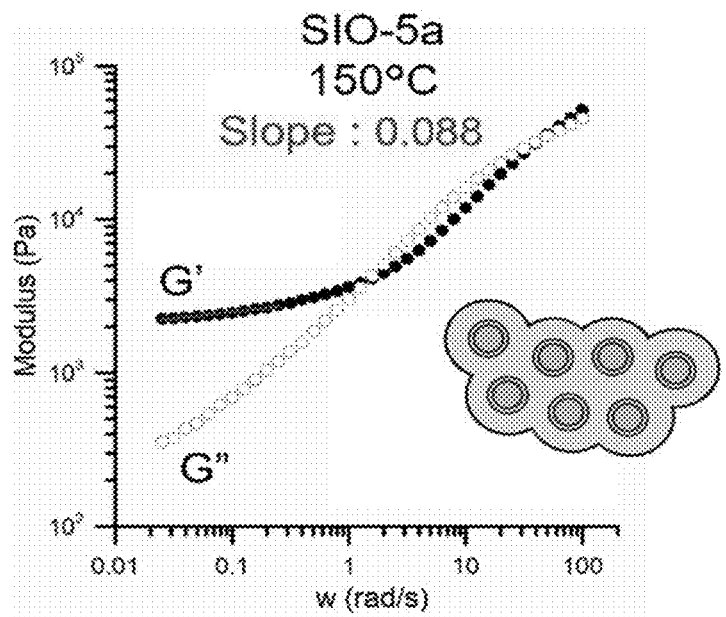
FIGS. 6B-6C depict representative images of frequency sweeps for SIO-5a (FIG. 6B) and SIO-5b (FIG. 6C) which show a flattening of the modulus at low frequencies, pointing to the presence of a triply periodic structure.
Figure 6C:
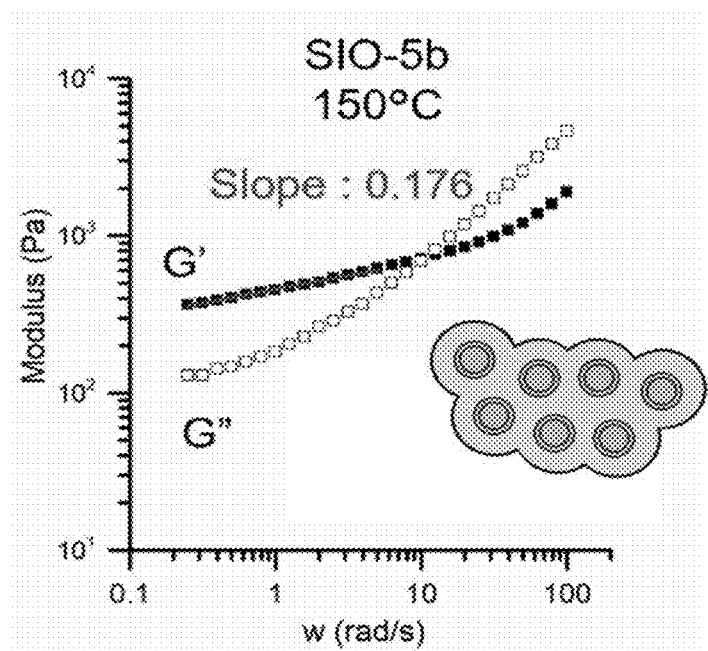

SIO-5a, SIO-5b, and SIO-5c were also characterized as forming a sphere morphology, but did not form a BCC structure. SIO-5a and SIO-5b had similar scattering profiles to the low temperature SIO-4a SAXS scattering profile (FIG. 6A). However, annealing at 250° C. for 12 hours was not sufficient to better resolve the peaks and started to disorder SIO-5c. The SAXS scattering profiles of 5a and 5b are similar to the SIO-4a sphere-forming sample. The SIO-5a, SIO-5b, and SIO-4a unannealed scattering profiles show a broad peak with 10× smaller scattering intensity than the principal peak at the $\sqrt{4}$ position and then show a third peak with 10× smaller scattering intensity than the second peak at the $\sqrt{6}$ position. This scattering profile is different from the samples which formed cylinders. The presence of higher order peaks confirms that there is a nanostructure formation occurring in these samples, but it is not periodic like the BCC structure in the SIO-4a annealed sample. Instead, SIO-5a and SIO-5b form a liquid-like packing of spheres similar to the SIO-4a sample before high temperature anneal. DMS of SIO-5a and SIO-5b shows little to no changes between the heating and cooling cycles (SI) unlike in SIO-4a (FIGS. 6B-6C). Frequency sweeps of all three polymers show the similar flattening of the slope of the modulus at low frequencies suggesting a sphere structure.

SIO-4a, SIO-3a, and SIO-4b all were able to be annealed into highly ordered structures while the rest of the samples were not. These samples that formed ordered structures of spheres or cylinders are all polymers with molecular weights smaller than the unordered polymers. The kinetics of morphology formation are well known to depend on molecular weight because longer chains have more localized entanglements. These entanglements impede the chain exchange between the spheres and therefore slow the formation of a structure with evenly distributed boundaries between each block as is observed in a well-ordered structure. The presence of higher-ordered peaks in the unordered samples shows that some of these shapes (spheres and cylinders) are forming within the polymer melt but are not ordering into a periodic structure which would reflect sharp peaks in the SAXS scattering. The assumption was that the unordered samples could become ordered if given enough time and heat. An extraordinarily long time could be necessary for these higher molecular weight polymers to form an ordered periodic morphology.

Figure 7A:
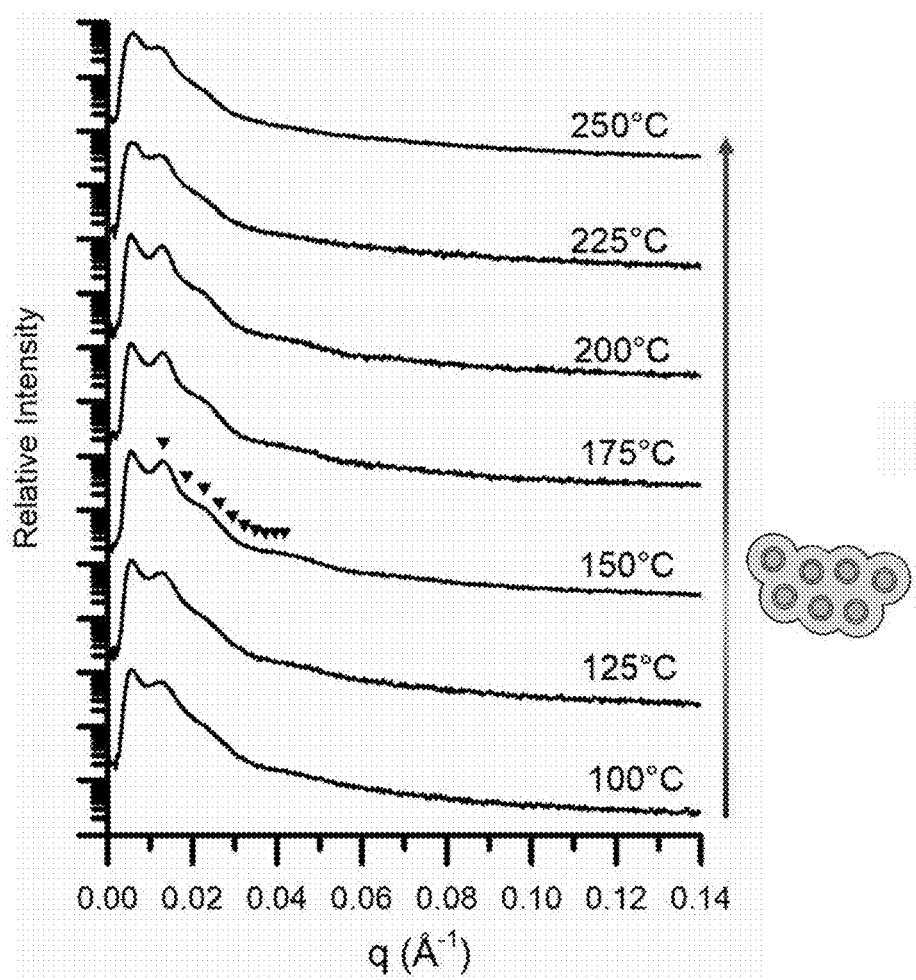
FIG. 7A depicts a representative image of SAXS scattering profiles of SIO-5c from 100° C. to 250° C., which shows the formation of LLP spheres at 150° C. and the disordering of the spheres above 200° C.
Figure 7B:
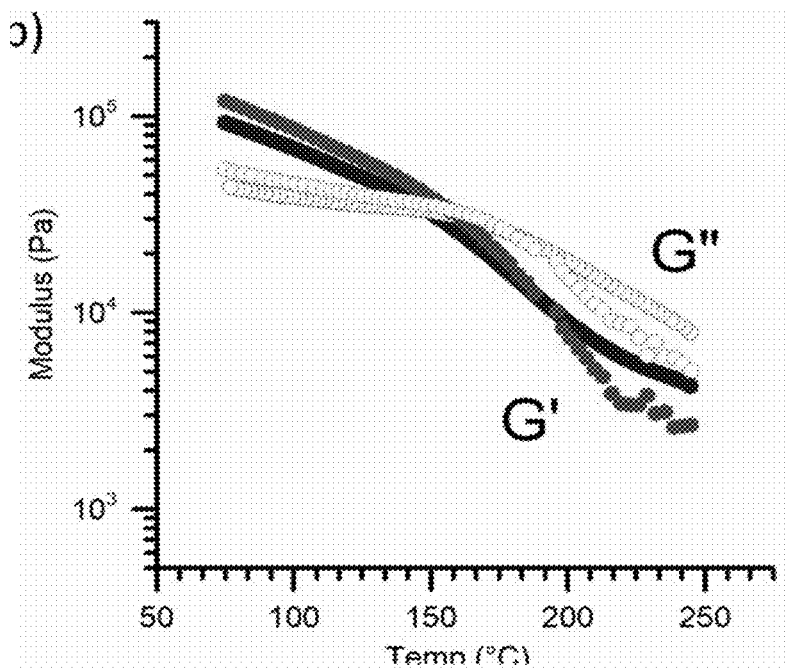
FIG. 7B depicts a representative image of DMS of SIO-5c which shows the polymer start to disorder at 200° C. during the heating cycle.
Figure 7C:
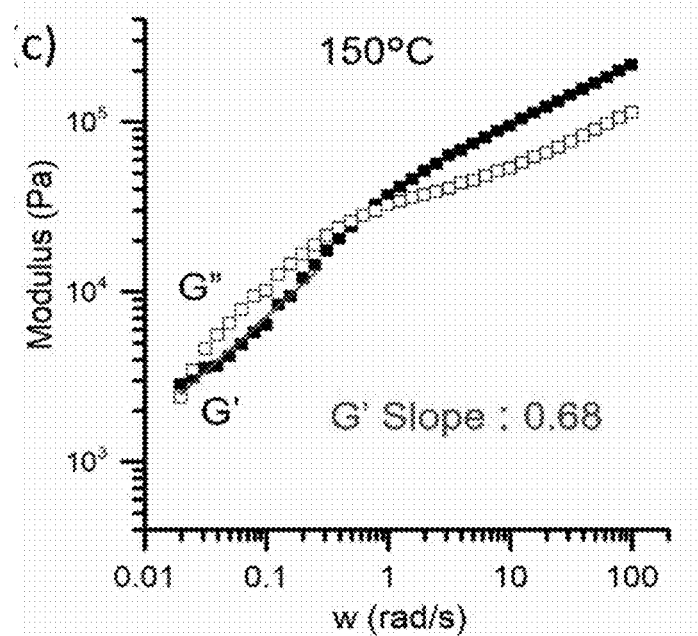
FIG. 7C depicts a representative image of frequency sweeps of SIO-5c which shows the decrease in modulus at low frequencies that was consistent with a less-ordered morphology.

Sphere-Disorder Phase Boundary. Between 150° C. and 200° C., Sample SIO-5c exhibits a SAXS scattering profile similar to the LLP spheres shown by 5a and 5b. Uniquely, 5c shows a decrease of intensity and broadening in the SAXS principal scattering peak as temperature increases. Because the sample is already not highly ordered, the sample seems to be moving towards disorder at temperatures above 200° C. (FIG. 7A). This is corroborated by the rheological measurements which show a loss of modulus at high temperatures with the heating cycle starting to show disorder above 200° C. (FIG. 7B). Frequency sweeps of SIO-5c show the decrease in modulus consistent with a less-ordered structure despite SAXS showing the presence of phase separation (FIG. 7C). None of the PS-PI-PEO or PS-PB-PEO showed severe decreases in modulus during rheological measurements to suggest actual disorder, even above 300° C. Therefore, the SIO-5c sample had a large enough volume fraction as to be on the boundary between the sphere phase region and disorder.

Determination of the Spheres Phase Region. Previous studies of the large A block and C blocks regions for all block orders have shown evidence of the sphere morphology, but have not given an in depth study of the volume fraction regions where a sphere morphology forms especially in the melt. The many variables governing ABC block polymer phase behavior provides phase region analyses which are useful to compare to but make analysis of the entire A/C block region of the phase diagram difficult. Polymers with a similar X value order to PS-PI-PEO only formed spheres by solvent-casting and thin-film conditions and did not give a study of the phase boundaries around the sphere region. A comprehensive phase diagram was investigated and compiled for PI-PS-PEO by Chatterjee. This change in block order results in a change in the values of X between the blocks and therefore causes slight changes in the interactions of the blocks. Despite these differences, it was not expected that the frustration between the blocks to completely prevented the formation of spheres. This was shown by the presence of spheres in both Chatterjee's PI-PS-PEO and our PS-PI-PEO. Instead, the morphology differences seen in the change in the size of the phase region or the type of sphere formed. The PI-PS-PEO sample only formed spheres at high temperatures and did not maintain the spheres upon cooling. Therefore, discovering where spheres form for the PS-PI-PEO could allow better understanding of the phase region for PI-PS-PEO when the C block volume fraction is larger than 0.87.

Therefore, the volume fraction boundaries of the sphere phase in ABC block copolymers was determined between disorder and hexagonally-packed cylinders. The knowledge of these regions demonstrate how to accurately target the necessary volume fraction. Computational studies had calculated the boundary to be about 0.77 volume fraction PEO when the PS volume fraction is 0.12 and the PS and PI volumes are equal. These volume fractions corresponded to the sphere region of the AB diblock phase diagram when PS was treated as the A block and therefore forming the bulk of the sphere. However, it was found that because both the PS and PI were a part of the sphere form, their volume fraction together acted as the single volume fraction when comparing to the AB sphere region. Therefore, the boundary between the sphere and the cylinder phase regions was placed at ~0.87 for the C block so that the A and B block combined have a volume fraction of 0.13. Polymers were synthesized that formed spheres when the ratio between the A and B blocks was 3:1 based on volume fractions. A change in the ratio between the blocks while maintaining the 0.87 volume fraction for the C block is feasible.

In sum, polymers were synthesized with volume fractions in the phase region that was predicted to form spheres to study if spheres can be formed in the melt with polymers larger than 100 kilodaltons (kDa). Polymers with volume fractions near this region were also synthesized and studied to determine the boundaries of the phase region. Observed was an ABC sphere-forming structure in PS-PI-PEO polymers with volume fractions larger than 0.87 of the C block and a 3:1 ratio of A to B volume fractions.

Example 4. Synthesis and Analysis of Hydrogels

In accordance with the present disclosure, sphere-forming block copolymers were prepared in order to make mechanically robust hydrogels. In an exemplary method, sphere-forming polystyrene-poly(ethylene oxide) (PS-PEO) block copolymers were used to make mechanically robust hydrogels. By adding a third block between the PS (polystyrene) and PEO (poly(ethylene oxide)) block, a variety of mechanical properties was added to the resulting hydrogels. Polydienes polybutadiene (PB) and polyisoprene (PI) were chosen to use as two different B blocks. The resulting ABC polymers were: 1) polystyrene-b-polybutadiene-b-poly(ethylene oxide) (PS-PB-PEO); or, 2) polystyrene-b-polyisoprene-b-poly(ethylene oxide) (PS-PI-PEO). The ABC polymers were then coupled to form a blend of PS-PI-PEO-PI-PS and PS-PI-PEO.

Hydrogel fabrication: pre-formed dried disk-shaped samples of PS-PB-PEO-PB-PS or PS-PI-PEO-PI-PS were subjected to a thermal processing step required to achieve the targeted sphere morphology. Water was then introduced to the cooled sample and allowed to equilibrate in deionized (DI) water for 24 hours. Once swollen, the gels were removed from the water and gently patted dry with a Kimwipe™ to remove excess water.

Tensile tests were carried out on rectangular pieces of hydrogel samples. All tensile tests were run at room temperature using the normal force transducer of a TA ARES rheometer. TA rectangular torsion geometry test fixtures were used as tensile test grips with added 600 grit sand paper. A strain rate of 2% strain/s was applied until complete hydrogel fracture. The strain rate was chosen to minimize slip while ensuring the maximum travel distance could be covered in less than 0.5 minutes, such that surface evaporation during testing could be minimized. Stress was calculated as the force normalized by the initial cross sectional area of each sample (engineering stress).

Swollen samples were subjected to unconfined compression testing to 40% strain over 6 successive cycles (5% strain/sec) at room temperature using a "cup bath" base and a 25 mm stainless steel upper parallel plate.

Example 5. Introducing Strand-Level Dissipation within a TPE Hydrogel Network Plastic deformation and slow recovery rates associated with the most advanced dissipative networks to date are largely the consequence of two related phenomena. One is that the secondary elastic network responsible for recovery has not been correlated to the dissipating elements in a manner that allows it to drive precise reassembly of the original composite architecture. The second issue is that the reformation of bonds or aggregates begins the instant the load is released, leading to a constant state of bond formation and breaking during unloading. While this process surely enhances dissipation efficiencies, it can and does act against rapid hydrogel recovery. And, because of the eventual equality between the strength of the reformed bonds and elastic restoring force in the system as strain is removed, is a likely contributor to the observed plastic deformation common in these systems. By forming a network architecture in the present disclosure that strongly correlates the elastic and dissipative contributions in a manner that favors precise reassembly of the network these effects were circumvented. A model of the network architecture herein, shown in FIG. 8, demonstrates a network that (1) ensures that the bulk viscoelastic behavior of the system map directly into each strand in the network, and (2) that every dissipative mechanism introduced ($\eta_2$) is implicitly coupled to its own driving force for elastic recovery ($E_3$). Furthermore, by tuning the strength of the integrated dissipative element, one can conceivably produce materials in which the amount of energy dissipated with each loading cycle can be tailored to the specific application of interest.

Figure 9:
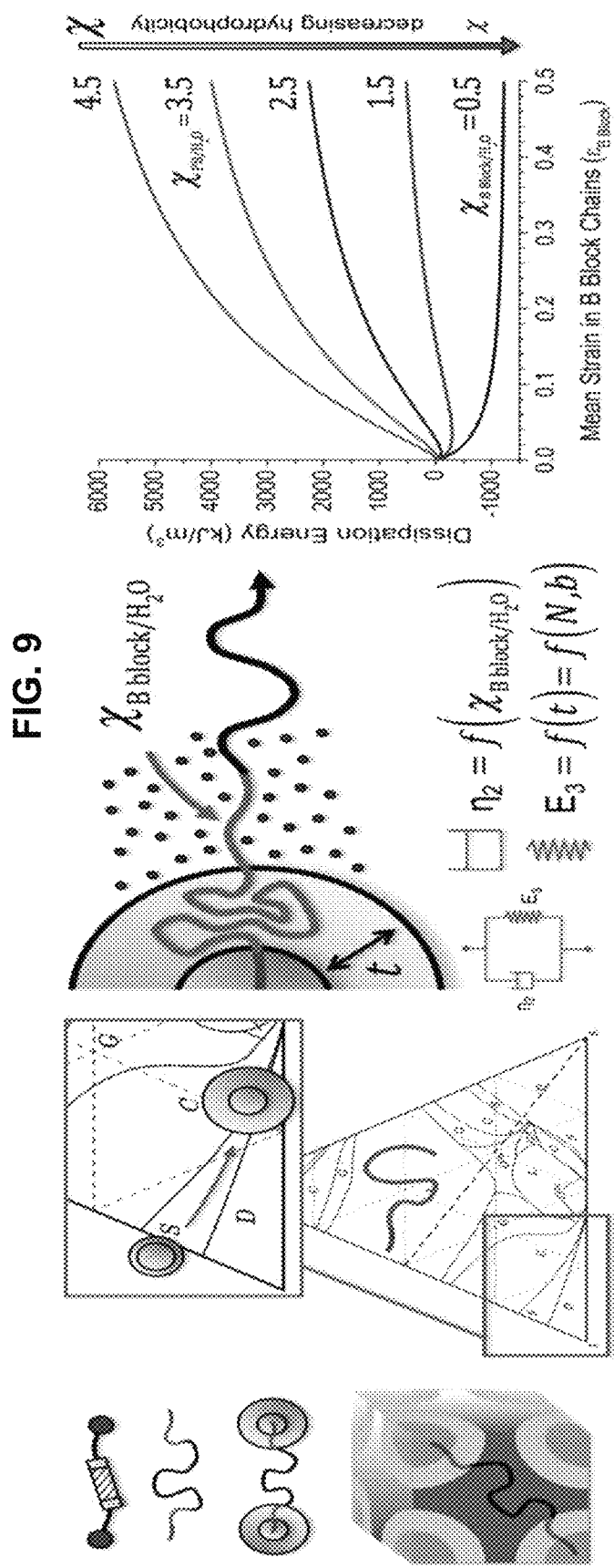
FIG. 9 depicts a schematic of dissipation in TPE hydrogel networks. The method of introducing dissipation into TPE hydrogel networks involves inserting viscous, hydrophobic B blocks into the network structure. Volume fractions of the three constituent blocks are selected to target block copolymers adopting a core-shell sphere morphology. SCF calculations predicted a large window of stability within the phase diagram, and an ability to tune the thickness of the shell domain over a considerable range. Dissipation was achieved by coupling extension of the B block to a forced increase in energetically unfavorable interactions between the hydrophobic B segments and the surrounding aqueous phase. Contribution of B blocks to the absorption of strain energy was contingent on the magnitude of the hydrophobicity ($\chi_{B\ block/H2O}$), chain flexibility (b), and the size (N) of the B blocks. Simple estimates of the energy that can be dissipated as a function of the mean strain experienced by the B block was based on Flory's model for the free energy of mixing B blocks with water and showed that dissipation energies could reach on the order of megajoules per cubic meter even at moderate $\chi_{B\ block/H2O}$ values and strains as small as 10%.

An example of the thermoplastic elastomer (TPE) hydrogel elastomer as a framework is captured in FIG. 9. In this case, an additional block (shown in red) is inserted between the PS and PEO blocks in both the diblock and triblock copolymer comprising the initial melt blend. Upon self-assembly, the B-block volume fractions are selected to favor formation of a core-shell sphere morphology, in which the newly inserted B blocks phase separate to form a coronal shell surrounding each spherical PS domain. Importantly, SCF calculations predict the phase window for core-shell sphere structures in nonfrustrated ABC triblock copolymer systems is quite significant, with clear opportunities to synthetically tune the volume (or thickness, t) of the coronal shell while readily maintaining the sphere morphology.

The purpose of the inserted B block, was to take on the role of the dissipative (yet elastically recoverable) Kelvin-Voigt element depicted in the network strand of FIG. 8. In order to do this, the B block should be (1) a (viscous) liquid over the use temperature of the hydrogel and (2) hydrophobic. In the hydrated state, water will preferentially swell the centralized PEO chains, while leaving the soft hydrophobic B chains in a thermodynamically preferred condensed (collapsed) state, minimizing their interaction with water. Under load, the hydrogel now has an opportunity to absorb strain through chain stretching of hydrated PEO chains (largely entropic with little dissipation) or through competitive chain extension of the collapsed B blocks (also entropic). However, the extension of B block chains out of the hydrophobic coronal shell simultaneously produced energetically unfavorable interactions with the surrounding water phase (enthalpic and ultimately dissipative). The degree to which the coronal B domain contributed to the strain and can actively dissipate energy will rely heavily on (1) the B block hydrophobicity ($\chi_{B\ block/H2O}$), which was related to the magnitude of $\eta_2$, and (2) the B block size (N) and statistical segment length (b), which are related to the magnitude of $E_3$ ($f_{chain} \sim (Nb^2)^{-1}$). It is conceivable that in either of the extremes, super hydrophobic or super hydrophilic (miscible) choices of B block, the system can revert to a non-dissipative material. Somewhere between those extremes, however, where the energetics are balanced in a way that encourages a contribution from both the B and C blocks, the dissipative capabilities of the network likely find a maximum.

FIG. 9 includes the estimated of the magnitude of the dissipation energy achievable by the network nanostructure, as a function of B block hydrophobicity ($\chi_{B\ block/H2O}$). By considering that the mean strain applied to the B blocks of the coronal shell effectively expands the coronal shell volume, and the new volume can be treated as a strain-generated polymer solution of B blocks and water, it was estimated the dissipation energy as the Flory free energy of mixing (See, e.g., Flory, Cornell University Press: Ithaca, 1953, the disclosure of which is incorporated herein in its entirety) was associated with this change. Note the the major components of the energy that can be dissipated are the enthalpy of mixing needed to make this new polymer solution, less the configurational entropy energy gained in generating the mixed state. Importantly, the energy associated with chain stretching was not included as it remained stored elastically. Also neglected was the initial interfacial energy of contact between the pure PB shell and hydrated PEO matrix, assuming the interfacial energy remained present in similar magnitude in the expanded state. These calculations suggested that even if the B blocks contributed only very little to the overall strain applied to the hydrogel, the energy that can be dissipated is substantial. For example, consider a hydrogel sample strained to 400%. The plot FIG. 9 shows that for $\chi_{B\ block/H2O} \sim 3.5$ (the value for polybutadiene (PB)/H$_2$O; See, e.g., Won et al., *Macromolecules* 2003, 36 (3), 953-955, the disclosure of which is incorporated herein in its entirety), a mean B block strain of only 10% (2.5% of the overall strain) could potentially dissipate on the order of 1.5 MJ/m$^3$ (~3 MJ/m$^3$ at 25%). This is already one to five times the magnitude of the bulk toughness values reported for the most advanced hydrogel systems, none of which can reproduce such levels of dissipation in combination with rapid cycling of the load.

Example 6. Material Synthesis, Characterization of Morphology, and Hydrogel Fabrication The PS-PEO diblock copolymer was synthesized through a two-step sequential anionic polymerization process, as described in examples herein, in which the first step is to generate a hydroxyl terminated PS block. This was achieved by initiation of styrene monomer with sec-butyllithium (cyclohexane, 40° C., 6-8 hrs) and end-capping the living polystyryl lithium chain end with a single repeat unit of ethylene oxide according to methods similar to those described in Quirk and Ma, *J. Polym. Sci., Part A: Polym. Chem.* 1988, 26 (8), 2031-2037, the disclosure of which is incorporated herein in its entirety. This intermediate, isolated as the primary alcohol, was then reinitiated as polystyryl potassium from which the propagation of ethylene oxide monomer was completed (40° C., 24 hrs) according to methods similar to those described in Guo and Bailey, *Soft Matter* 2010, 6 (19), 4807-4818; and Bailey et al., *Macromolecules* 2001, 34 (20), 6994-7008, the disclosures of which are incorporated herein in their entirety. Formation of the PS-PEO-PS triblock copolymer was carried out through coupling of the alkoxide chain ends of the living PS=PEO diblock copolymer using an coupling agent like α,α'-Dibromo-p-xylene according to methods similar to those described in Guo and Bailey, *Soft Matter* 2010, 6 (19), 4807-4818; Guo and Bailey, *Soft Matter* 2015, 11 (37), 7345-7355; and Guo et al., *Chemistry of Materials* 2016, 28 (6), 1678-1690, the disclosures of which are incorporated herein in their entirety. Typical coupling efficiencies fell between 70 and 90 mol %, with the balance comprising uncoupled PS-PEO diblock copolymer. The coupling product was fractionated (chloroform/pentane, 40° C.) to isolate pure PS-PEO-PS triblock copolymer according to methods similar to those described in Guo and Bailey, *Soft Matter* 2015, 11 (37), 7345-7355, the disclosure of which is incorporated herein in its entirety; but for blends in which the targeted triblock copolymer composition was less than that of the coupling product, simple dilution with excess PS-PEO diblock copolymer was preferable, and the concentration was still quantifiable via SEC. For these studies, the use of a single triblock copolymer composition of 50 mol % was will targeted. Targeted PS-PEO molecular weights were 8-10 kDa for PS, and 80-90 kDa for PEO. These ranges ensured the PS cores are glassy at room temperature ($T_g$~ 80-90° C.; See. e.g., Fox and Flory, J Polym Sci 1954, 14 (75), 315-319, the disclosure of which is incorporated herein in its entirety), and PS volume fractions sit in the 0.10-0.13 range, over which the sphere morphology was adopted according to methods similar to those described in Guo and Bailey, *Soft Matter* 2010, 6 (19), 4807-4818; Guo and Bailey, *Soft Matter* 2015, 11 (37), 7345-7355; and Guo et al., *Chemistry of Materials* 2016, 28 (6), 1678-1690, the disclosures of which are incorporated herein in their entirety.

Figure 10:
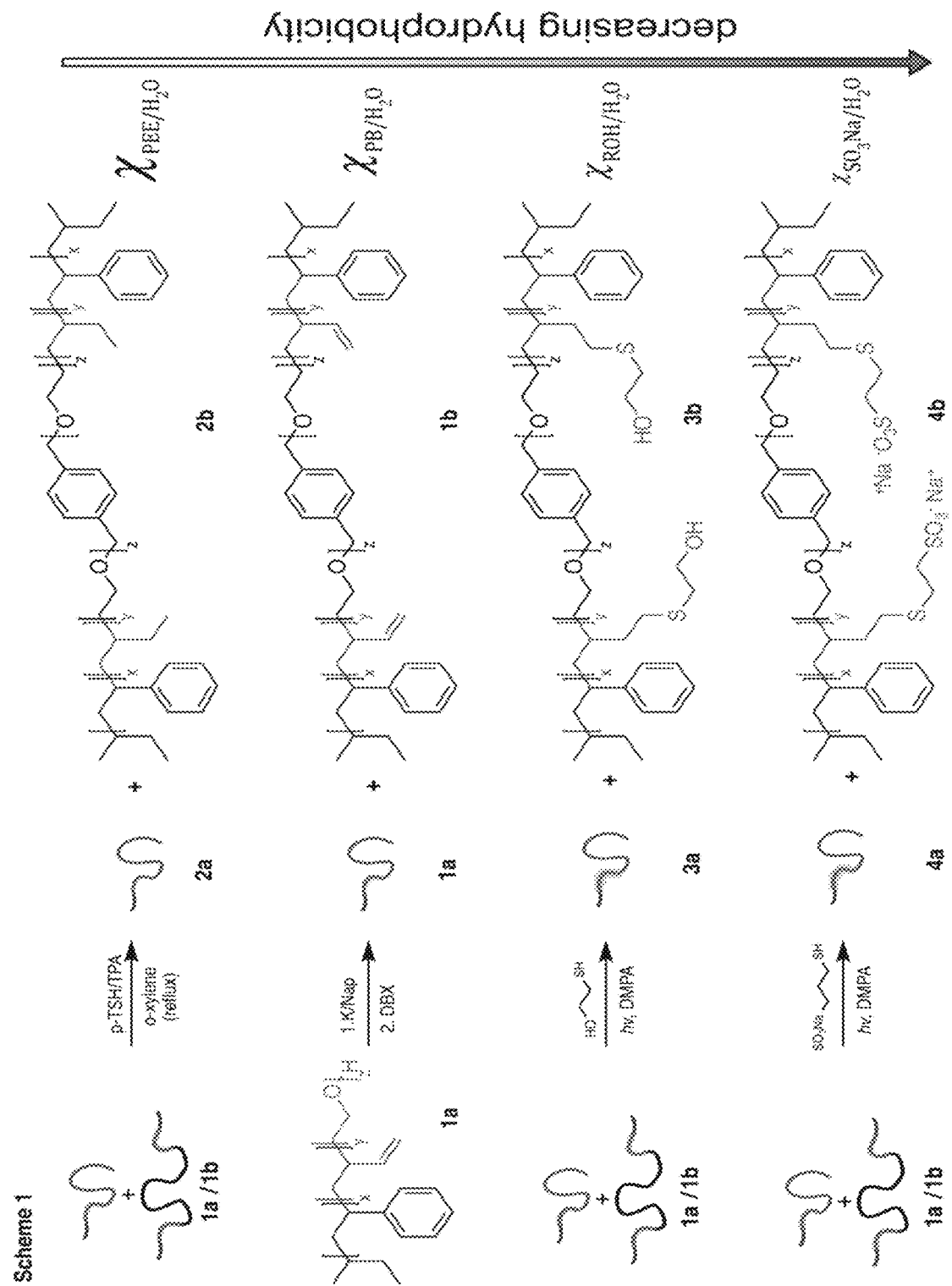
FIG. 10 depicts a schematic of the synthesis of triblock and pentablock copolymers.

1,2-Polybutadiene (PB) was selected as an ideal dissipative B block for the second objective given its subzero $T_g$~-30° C. (See, e.g., Makhiyanov and Temnikova, *Polymer Science Series A* 2011, 52 (12), 1292-1300, the disclosure of which is incorporated herein in its entirety) moderate to strong hydrophobicity ($\chi_{PB/H2O}$~ 3.5, see FIG. 9 for estimated dissipation energy available), and reactive alkene side chains suitable for easy post-polymerization modification of the chain. Polybutadiene also has a relatively low entanglement molecular weight (1.9 kDa), which helped to promote cooperative engagement of B block chains. Most importantly, butadiene monomer was compatible with anionic polymerization and was be easily incorporated in the same two-step sequential anionic polymerization methodology used to generate PS-PEO diblock copolymer. Essentially, butadiene monomer was added directly to the living polystyryl lithium chains following complete reaction of all styrene monomer. Typical butadiene polymerizations producing 1,2 content approaching 90% was accomplished in cyclohexane (CHX) (40° C., 6-8 hrs) with small amounts of tetrahydrofuran (THF) added as a polar modifier according to methods similar to those described in Weimann et al., *Macromolecules* 1997, 30 (12), 3650-3657; and Young et al., *Adv Polym Sci* 1984, 56, 1-90, the disclosures of which are incorporated herein in their entirety. Addition of one unit of ethylene oxide to the living polybutadienyl lithium chains resulted in the addition of only one unit as before (See, e.g., Quirk and Ma, J. Polym. Sci., Part A: Polym. Chem. 1988, 26 (8), 2031-2037, the disclosure of which is incorporated herein in its entirety). The PS-PB-OH diblock copolymer, isolated as the alcohol, was then reinitiated as polybutadienyl potassium from which the propagation of ethylene oxide monomer was completed (40° C., 24 hrs, THF) according to methods similar to those described in Bailey et al., *Macromolecules* 2001, 34 (20), 6994-7008, the disclosure of which is incorporated herein in its entirety. As shown in FIG. 10, formation of the PS-PB-PEO-PB-PS pentablock terpolymer (1b) was simply carried out through coupling of the alkoxide chain ends of the living PS-PB-PEO triblock terpolymer (1a) using α,α'-Dibromo-p-xylene as introduced previously as a coupling agent. As with the PS/PEO systems, pentablock terpolymer compositions of 50 mol % (quantified via SEC) were targeted in the blends to ensure consistency with the PS/PEO system above. Three sets of PS-PB-PEO triblock and PS-PB-PEO-PB-PS pentablock terpolymer samples (FIG. 10; 1a/1b) were synthesized, differing in the size of the PB block incorporated. $N_{PB}$ values (based on a fixed reference volume) were targeted to produce volume fractions of PB that were 0.5, 1.0, and 1.5 times that of the PS block. In FIG. 10, this corresponded to changing the repeat unit degree of polymerization (y) of the PB blocks. $N_{PEO}$ values (which are quite large relative to $N_{PB}$ and $N_{PS}$) and adjusted as necessary to maintain a shared overall N value among the baseline PS-PEO system and the three sets of PB containing block copolymers. Importantly, the batches of PS-PB-OH macroinitiator synthesized (80-100 g) during this step contained PS blocks which were Mn matched to those in the PS-PEO baseline hydrogels (8-10 KDa Mn) to promote consistency in aggregation numbers within the PS core domains (i.e. junction point functionality) of the two systems. Targeted PB molecular weights were approximately 5 kDa, 10 kDa and 15 kDa. Importantly, these molecular weight ranges ensured the PS and PB volume fractions were positioned well within the phase window predicted for core-shell sphere morphologies (See, e.g., Tyler et al., Macromolecules 2007, 40 (13), 4654-4668, the disclosure of which is incorporated herein in its entirety). Some modification of these molecular weights may be necessary to define the true experimental phase window for the PS/PB/PEO system. Increasing $N_{PB}$ can reduce the effective spring constant of the B block domain ($f_{chain}$~ $(Nb^2)^{-1}$). In terms of the analogy to a Kelvin-Voigt element, this corresponds to the hydrophobic interactions playing a more and more significant role in determining the fraction of strain contributed by the coronal chains.

To evaluate the influence of changing the B block hydrophilicity on the degree of dissipation generated by the system (FIG. 9), a single batch of 1a/1b (FIG. 10) was synthesized with a specific value of y (or $N_{PB}$), and used for all subsequent modification reactions (i.e., to form 2a/2b, 3a/3b, and 4a/4b in FIG. 10). The specific choice of y selected was based on the probable likelihood of producing differences in behavior from 1a/1b (FIG. 10).

Three unique B block modification are shown in FIG. 10. The first is a selective hydrogenation of the B block to transform PB into the polyethylethylene (PEE). Such transformations can be carried out in the presence of polystyrene using p-toluenesulfonyl hydrazide (TSH) and tripropylamine (TPA) under an o-xylene reflux. Ideally, the hydrogenation can be carried out on a sample of the 1a/1b directly (FIG. 10). In the event selective hydrogenation of PB to form 2a/2b is not possible in the presence of the PEO, the hydrogenation reaction can be performed first on the corresponding batch of PS-PB-OH (same $N_{PB}$ value) (FIG. 10). The resulting PS-PEE-OH diblock copolymer is used as a macroinitiator for the growth of ethylene oxide and coupling used to form the final PS-PEE-PEO-PEE-PS pentablock terpolymer. Relative to PB, PEE produces higher energetic penalties for contact with the aqueous phase ($\chi_{PEE/H2O}$> $\chi_{PB/H2O}$).

The second and third modifications rely on the use of thiolene click reactions between functional thiols and the pendant alkene units of the 1,2-PB block. As depicted in FIG. 10, 3a/3b and 4a/4b were produced from the modification of the PB block with 2-mercaptoethanol and sodium 3-mercapto-1-propanesulfonate, respectively, using 2,2-dimethoxy-2-phenylacetophenone (DMPA) as a photoinitiator for the thiolation reactions according to methods similar to those described in Wu et al., *Journal of Macromolecular Science*, Part A 2014, 51 (3), 229-239; and Hunt et al., *Adv Mater* 2011, 23 (20), 2327, the disclosures of which are incorporated herein in their entirety. Both of these modifications were expected to reduce the hydrophobicity of the B block relative to PB ($\chi_{PEE/H2O} > \chi_{PB/H2O} > \chi_{ROH/H2O} > \chi_{SO3Na/H2O}$), with the ionic sulfate expected to severely reduce the energetic penalty for contact with water. Without wishing to be bound by theory, whether that is sufficient to drive miscibility with water is currently unknown, but could in theory eliminate the dissipative capabilities of the hydrogel altogether. If the corollary is true and the coronal shell stays collapsed due to the intrinsic hydrophobicity of the all carbon backbone, the presence of ionic groups may very well produce interesting consequences for the mechanics of the hydrogel. Ideally, the hydrophobicity of the B block becomes reduced significantly enough through these transformations that forces associated with chain stretching become the dominant factor determining the strain contribution to the system (cf. FIG. 9, $\Delta G_{mix} < 0$ for $\chi_{B\ block/H2O} \sim 0.5$). With the exception of 4a/4b (due to its charge) (FIG. 10), molecular weight distributions before and after hydrogel formation are easily characterized with standard size exclusion chromatography (SEC) measurements. Relative block compositions are characterized by $^1$H NMR. Morphology is characterized using a combination of melt rheology, small angle X-ray scattering (SAXS), data fit to models (e.g. the Percus-Yevick hard sphere model; See, e.g., Guo and Bailey, *Soft Matter* 2010, 6 (19), 4807-4818; Guo and Bailey, *Soft Matter* 2015, 11 (37), 7345-7355; Guo et al., *Chemistry of Materials* 2016, 28 (6), 1678-1690; Kinning and Thomas, *Macromolecules* 1984, 17 (9), 1712-1718; and Percus and Yevick, *Phys Rev* 1958, 110 (1), 1-13, the disclosures of which are incorporated herein in their entirety) and transmission electron microscopy (TEM) (as needed).

Figure 11:
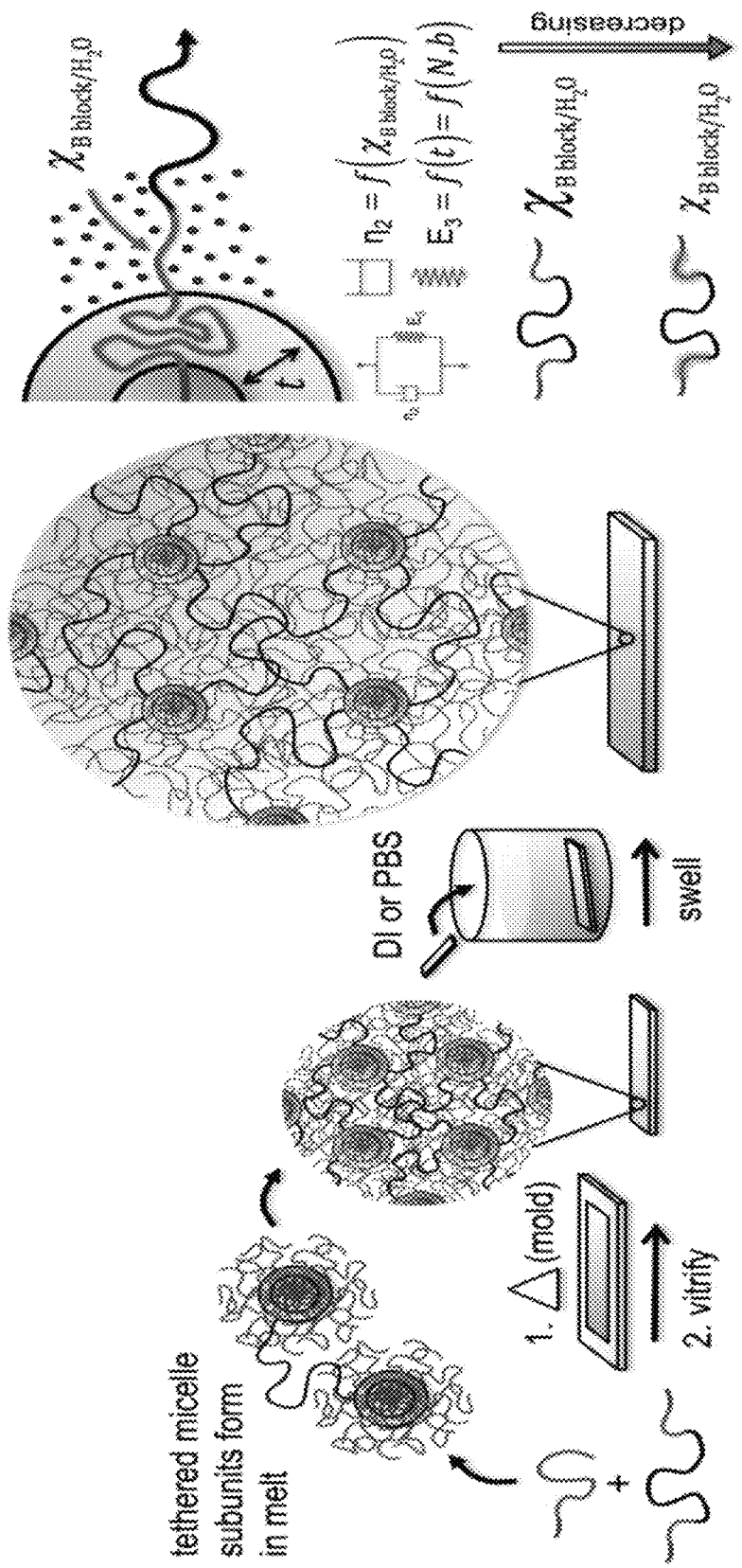
FIG. 11 depicts a schematic of the hydrogel fabrication process. Blends of triblock and pentablock copolymers (1a/1b, 2a/2b, 3a/3b, 4a/4b; see FIG. 10) were heated under vacuum and molded into appropriate shapes for mechanical testing. During heating, the microphase separation generated a sphere-based morphology critical to the TPE network paradigm. Samples were cooled to vitrify the PS cores, and then placed in excess water or PBS buffer. All samples were tested at swelling equilibrium. Both the size of the B block forming the coronal shell and its hydrophobicity were expected to contribute to the level of dissipation exhibited in the hydrogels.

The hydrogel fabrication process is depicted in FIG. 11. Block copolymer was typically heated under vacuum at pressures of 500 psi and molded into appropriate shapes for mechanical testing. Mold temperatures for PS/PEO systems were typically in the 150° C. range, with soak times between 5 and 15 minutes. These parameters were determined to be sufficient for development of the sphere-based morphology critical to the TPE network paradigm. Temperatures and soak times for the new block copolymers formed were determined by watching the development of morphology over time using SAXS, and making adjustments as needed. Importantly, only liquid like packing (LLP) of spheres was required for adequate network formation (See, e.g., Guo and Bailey, *Soft Matter* 2010, 6 (19), 4807-4818; Guo and Bailey, *Soft Matter* 2015, 11 (37), 7345-7355; and Guo et al., *Chemistry of Materials* 2016, 28 (6), 1678-1690 the disclosures of which are incorporated herein in their entirety). Development of lattices of higher order (e.g., BCC) was not required and was not appeared to influence mechanical properties to date. Samples were cooled to vitrify the PS cores, and then placed in excess water or PBS buffer. All samples were tested at swelling equilibrium.

Mechanical Characterization. To evaluate the mechanical properties of the hydrogel networks, a series of mechanical experiments are performed to establish quantitative relations between the molecular structure, specifically morphology of the hydrophobic coronal shell, and the macroscopic mechanical behaviors manifested through the modulus, hysteresis and rate-dependence. How energy dissipation enabled by the hydrophobic coronal shell affects the fracture and fatigue resistance of the hydrogel network is determined. Two types of mechanical tests are proposed (i) uniaxial tensile or compressive tests; (ii) crack propagation tests under fixed or cyclic loadings.

Figure 12A:
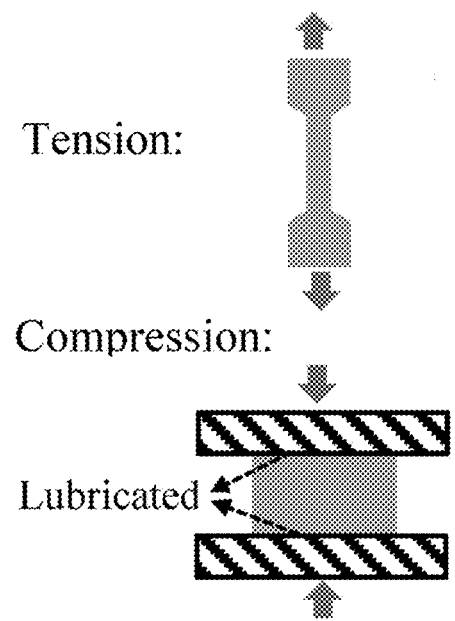
FIGS. 12A-12B depict schematics of uniaxial tension and compression tests (FIG. 12A) and nominal stress-nominal strain curve for cyclic loading (FIG. 12B). The dashed line illustrates the tangent modulus and the dark area represents the hysteresis.

(i) Uniaxial Tensile or Compressive Tests. To study the stress-strain responses of hydrogel samples with different B block chemical compositions and hence different coronal morphologies, both uniaxial tensile and compressive tests are performed. These two loading modes require different sample geometries as illustrated in FIG. 12A. Under uniaxial compression, a hydrogel sample expands laterally in an equi-biaxial manner, which is stiffer than uniaxial extension. Therefore, data from the tension and compression tests are complementary and display the hydrogel's mechanical property under two distinct strain states. In a typical experiment, a hydrogel sample undergos cyclic loading with loading and unloading branches. The strain rates of loading and unloading are altered independently to address the potential rate-dependence associated with the disruption and recovery of the hydrophobic coronal shell. Three key parameters are extracted from the experimental data.

Figure 12B:
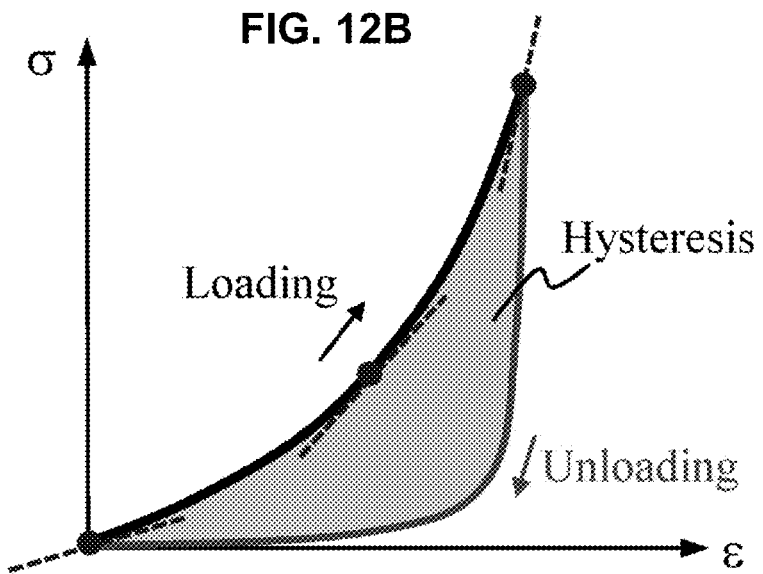

Tangent modulus, namely the slope of the stress-strain curve, at given strain levels along the loading stages are computed (see FIG. 12B). This parameter indicates how the network stiffness evolves as the hydrophobic B-block chains are extended out from the coronal shell.

Hysteresis are quantified as the area between the loading and unloading branches of the measured stress-strain relations (see FIG. 12B). Physically this parameter represents the energy dissipation per unit volume over one loading cycle.

The minimum time required for the hydrogel to recover between consecutive loading cycles is measured. This parameter is an indication of how fast the extended B block chains can contract to reform the coronal shell.

Measurements of these three parameters for different B-block sizes and chemical compositions are useful data for probing the molecular mechanism of the proposed hydrogel network. In addition, examination of how the tangent modulus and hysteresis depends on strain rates of loading and unloading branches demonstrates the characteristic time scales for the disruption and recovery of coronal shells.

The uniaxial tests are also leverage to characterize failure through two measurements: ultimate strength and fatigue degradation. For the former, samples are monotonically loaded at various strain rates until failure, and the nominal stress at break is taken as the ultimate strength. As for the fatigue degradation, samples are subjected to tens of thousands of loading-unloading cycles. Decay in the initial modulus (i.e. tangent modulus at zero strain) as the number of total cycles increases is used as an indicator of degradation due to fatigue, and measured for various strain amplitudes and cycle frequencies.

(ii) Crack Propagation Tests. Mechanical failure characterized through uniaxial tests, e.g. the ultimate strength and fatigue degradation as described above, can suffer from considerable data scattering due to sample-to-sample variations. This is because test samples inevitably contain pre-existing defects (e.g. voids) where failure initiates due to the locally amplified stress, and the stochastic nature of such defects leads to the scattering of failure data. Therefore, fracture tests with cracked samples are commonly used to achieve more consistent characterization of failure, where a dominating defect, i.e. a crack, is introduced and its growth under external loading is examined to reflect the material's resistance to failure. Here crack propagation tests under two loading cases: high-amplitude, fixed loading (for fracture resistance) and low-amplitude, cyclic loading (for fatigue resistance), are performed as detailed below.

Fracture resistance of soft hydrogels is characterized by the fracture toughness F (unit: $J/m^2$), defined as the energy required for a crack to advance by a unit area (See, e.g., Won et al., *Macromolecules* 2003, 36 (3), 953-955, the disclosure of which is incorporated herein in its entirety). Pure-shear geometry is adopted to measure F for the hydrogel samples prepared herein. As illustrated in FIG. 13A, a wide hydrogel sample, with width L>>height h, is clamped by rigid plates on the top and bottom boundaries. A crack with length c (c<<L) is introduced to the left side of the sample, e.g. using a razor blade. A displacement Δ is applied at the top boundary while the bottom one remains fixed. This stretches the hydrogel sample, opens the crack and eventually initiates crack growth when A is sufficiently large. The major advantage of this configuration is that its large width L facilitates the development of a steadily propagating crack with a constant speed v, which is necessary for the proper calculation of F. This configuration also allows easy imaging of the crack propagation to determine the speed of crack propagation. Specifically, displacement Δ is first rapidly applied and kept constant afterwards (see FIG. 13B) so that the crack settles at a constant speed v (See, e.g., Mayumi et al., *Extreme Mech Lett* 2016, 6, 52-59, the disclosure of which is incorporated herein in its entirety). Based on literature data (Mayumi et al., *Extreme Mech Lett* 2016, 6, 52-59; Baumberger et al., *Nat Mater* 2006, 5 (7), 552-555; Lefranc and Bouchaud, *Extreme Mech Lett* 2014, 1, 97-103; and Seitz et al., *Soft Matter* 2009, 5 (2), 447-456) this speed v is expected to be a function of the applied displacement Δ, i.e. the crack propagates faster with larger stretch. The steady-state crack speed v is measured by imaging the motion of the crack and the toughness Γ is calculated according to $$\Gamma = hW(\Delta/h), \quad (1)$$

where W(Δ/h) is area under the stress-strain curve measured from an uncracked sample with identical dimensions and evaluated for nominal strain ranging from 0 to Δ/h (Sun et al., *Nature* 2012, 489 (7414), 133-136; Sun et al., *Nat Mater* 2013, 12 (10), 932-937; Long and Hui, *Soft Matter* 2016, 12 (39), 8069-8086; Rivlin and Thomas, *J Polym Sci* 1953, 10 (3), 291-318; and Zhao, *Soft Matter* 2014, 10 (5), 672-687). This set of experiments provided a function Γ(v) that described how fracture resistance of the hydrogel depends on the crack speed. The effect of the coronal shell is evaluated by comparing the function Γ(v) measured among the hydrogels with varied B-block compositions and shell thicknesses.

Fatigue refers to the failure occurring at cyclic loadings with low amplitudes. Pure shear geometry is adopted herein to study crack growth under fatigue, but a different loading history is employed as shown in FIG. 13C. Under such small amplitude, the crack does not grow over the first few cycles. However, over a large number of cycles (e.g cycle number N~$10^3$ to $10^5$), the crack starts to grow and reach a steady speed quantified by the increase in crack length per cycle dc/dN. dc/dN is determined by measuring the crack length c at a given cycle number N using optical imaging. The dependence of dc/dN on the amplitude Aa and frequency f of the cyclic loading is determined for hydrogels with different compositions.

The uniaxial tension and compression tests and the fracture tests are completed using an electromechanically driven mechanical tester (Instron 5965). The fatigue tests are completed using a hydraulic driven mechanical tester (MTS 858 Mini-Bionix II) that is capable of long testing time and large loading cycles or a dynamic mechanical analyzer (TA Instruments Q800) to access high frequency tests. If solvent evaporation becomes significant during fatigue tests with low frequencies and hence long testing times, solutions such as enclosing the hydrogel sample in a chamber/bath of paraffin oil are explored according to methods similar to those described in Long et al., *Macromolecules* 2014, 47 (20), 7243-7250, the disclosure of which is incorporated herein in its entirety.

Example 7. Pentablock Copolymer Formation, Hydrogel Preparation, and Characterization Thereof Hydrogels were prepared using the polymer blocks disclosed herein. First, triblock copolymers were prepared for SIO coupling. In brief, PS-PB-PEO-OH or PS-PI-PEO-OH was dried overnight under vacuum in a 500 mL volumetric flask. The polymer was then dissolved in ~200 mL of dry, air-free THF. Potassium napthalenide with a known concentration was added to the purification flask via air-free syringe until a light green color persisted for at least 20 minutes. A solution of α,α'-dibromo-p-xylene dissolved in THF was added to the flask via syringe pump (1 mol DBX:2 mol KNAP added) over the course of 8 hours. The next day, the polymer was precipitated into pentane and dried under vacuum at room temperature for 48 hours.

The resulting pentablock copolymers were characterized according to methods previously described herein, at least in the examples above. Table 2 shows pentablock copolymers used in the hydrogels described below.

TABLE 2

Pentablock Copolymers

| Polymer | S Mn (g/mol) | B/I Mn (g/mol) | O Mn (g/mol) | $f_S$ | $f_{B/I}$ | $f_O$ | Mol % Coupling | Q (g water/g polymer) | Energy Dissipated in Compression (kPa) |
|---|---|---|---|---|---|---|---|---|---|
| SI-5 | 10200 | 2800 | 0 | 0.760 | 0.241 | 0 | — | — | — |
| SIO-5a | 10200 | 2800 | 102300 | 0.096 | 0.031 | 0.874 | — | — | — |
| SIOIS-5a-25 melt | 20400 | 5600 | 204600 | 0.096 | 0.031 | 0.874 | 25% | 10.75 | 0.652 |
| SIOIS-5a-25 CHCl3 | 20400 | 5600 | 204600 | 0.096 | 0.031 | 0.874 | 25% | 12.46 | 0.305 |
| SI-6 | 17200 | 4100 | 0 | 0.781 | 0.220 | 0 | — | — | — |
| SIO-6a | 17200 | 4100 | 193800 | 0.096 | 0.027 | 0.877 | — | — | — |

TABLE 2-continued

Pentablock Copolymers

| Polymer | S Mn (g/mol) | B/I Mn (g/mol) | O Mn (g/mol) | $f_S$ | $f_{B/I}$ | $f_O$ | Mol % Coupling | Q (g water/g polymer) | Energy Dissipated in Compression (kPa) |
|---|---|---|---|---|---|---|---|---|---|
| SIOIS-6a-50 Melt | 34400 | 8200 | 346000 | 0.096 | 0.027 | 0.877 | 50% | 13.59 | 0.297 |
| SIOIS-6a-50 CHCl3 | 34400 | 8200 | 346000 | 0.096 | 0.027 | 0.877 | 50% | 14.41 | 1.995 |
| SIOIS-6a-30 CHCl3 | 34400 | 8200 | 346000 | 0.096 | 0.027 | 0.877 | 30% | 16.78 | 1.997 |
| S-1 | 9600 | 0 | 0 | 1 | 0 | 0 | — | — | — |
| SO-1a | 9600 | 0 | 73000 | 0.126 | 0 | 0.874 | — | — | — |
| SOS-1a-73 CHCl3 | 19200 | 0 | 146000 | 0.126 | 0 | 0.874 | 73% | 9.24 | 0.549 |

Using the pentablock copolymers above, hydrogels were prepared by solvent-casting. In brief, 0.1 g of PS-PI-PEO-PI-PS or PS-PB-PEG-PB-PS was dissolved in 2 mL of chloroform (CHCl3) in a 3 mL Teflon beaker sitting inside a covered, unsealed vacuum holm for 6 days resulting in a polymer disc~1 mm in thickness. Once all of the CHCl3 was evaporated, the samples were placed in DI water for 24 hours until swollen to equilibrium.

The hydrogels prepared by solvent-casting using the pentablock copolymers above were subjected to compressive tests according to the methods described in detail in the above examples.

Figure 14A:
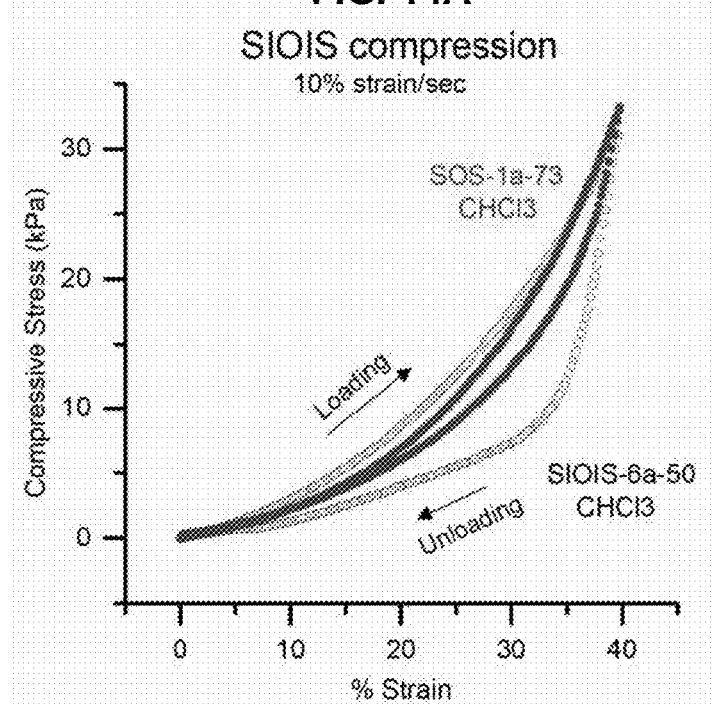
FIGS. 14A-14B depict compressive stress-strain curves for a SOS hydrogel made through solvent-casting and the large PS SIOIS hydrogel made through solvent casting (FIG. 14A) and for two large PS hydrogels with different coupling percentages (FIG. 14B).
Figure 14B:
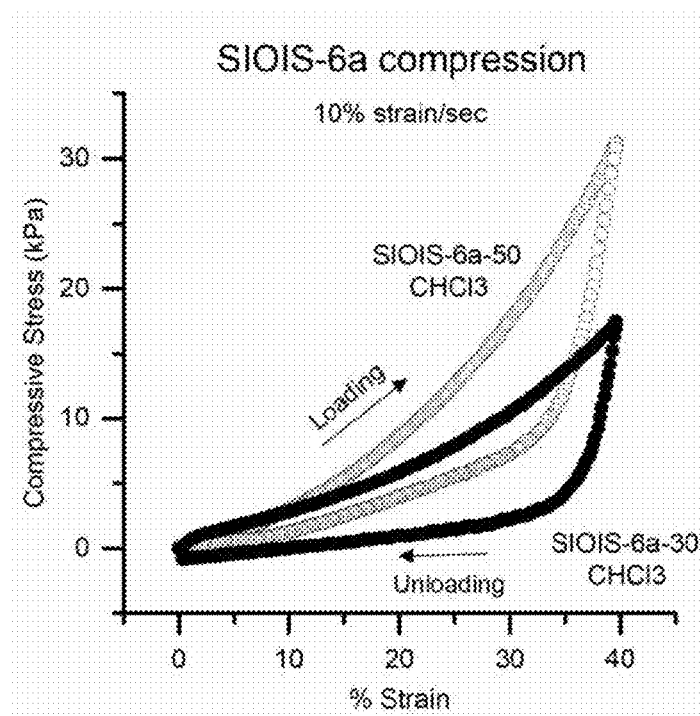

FIG. 14A shows the compressive stress-strain curves for the SOS hydrogel made through solvent-casting and the large PS SIOIS hydrogel made through solvent casting. The difference between the loading and unloading curves was the energy dissipated in the sample. The hysteresis for the SIOIS was larger than for the SOS. FIG. 14B shows the compressive stress-strain curves for two large PS hydrogels with different coupling percentages. Both hydrogels dissipated a similar amount of energy, but similar to previously made SOS hydrogels, the SIOIS hydrogel with the smaller coupling percentage had a smaller compressive modulus.

FIG. 15A shows compressive stress strain curves for a hydrogel made from large molecular weight PS, SIOIS-6a-50, processed by heating in the melt and by solvent-casting from CHCl3. The amount of energy dissipated when the hydrogel which was processed by solvent-casting was much larger than the hydrogel processed by melt-pressing. FIG. 15B shows SAXS of the SIO-6a polymer which was coupled to form these hydrogels and demonstrates that the solvent-cast hydrogel forms a smaller sphere size as seen by the smaller principal scattering peak (q*).

Figure 16:
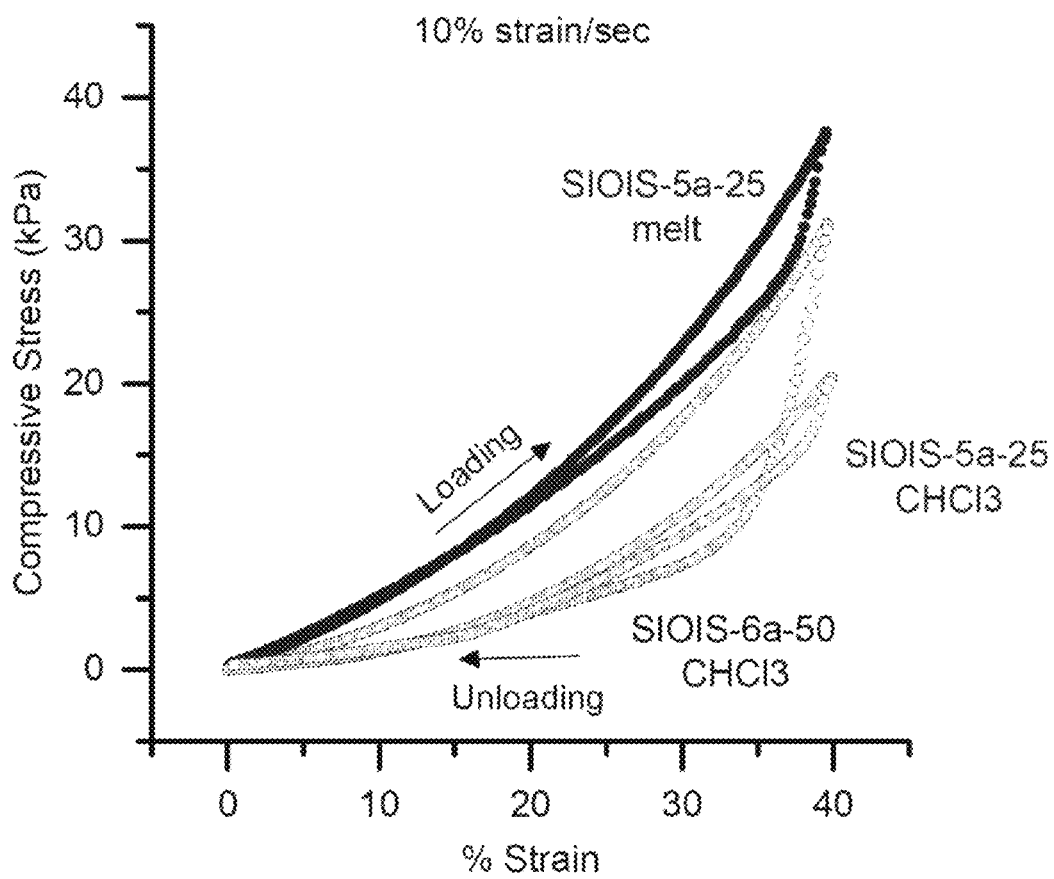
FIG. 16 depicts compressive stress-strain curves of a hydrogel made from the large 17 kDa PS, SIOIS-6a as solvent cast compared to hydrogels made from the smaller molecular weight PS both melt processed, SIOIS-5a-25 melt, and by solvent casting from CHCl3, SIOIS-5a-25 CHCl3.

FIG. 16 shows the compressive stress-strain curves of a hydrogel made from the large 17 kDa PS, SIOIS-6a as solvent cast, vs the hydrogels made from the smaller molecular weight PS both melt processed, SIOIS-5a-25 melt, and by solvent casting from CHCl3, SIOIS-5a-25 CHCl3. The solvent cast SIOIS-5a-25 dissipated less energy than the melt processed samples. Additionally, both SIOIS-5a-25 samples dissipated less energy than the larger molecular weight PS, SIOIS-6a-50 CHCl3.

What is claimed is:

1. A polymeric material comprising a blend, wherein the blend comprises at least one triblock copolymer and at least one pentablock copolymer, wherein the at least one triblock copolymer comprises a triblock copolymer according to formula (I):

A-B-C    (I)

wherein,
A is a polystyrene block;
B is a polydiene block; and
C is a polyalkylene oxide block, and
wherein the at least one pentablock copolymer comprises a pentablock copolymer according to formula (II):

A-B-C-B-A    (II)

wherein,
A is a polystyrene block;
B is a polydiene block; and
C is a polyalkylene oxide block.

2. The polymeric material of claim 1, wherein the polydiene block of formula (I) or formula (II) or both comprises a polybutadiene block or a polyisoprene block.

3. The polymeric material of claim 1, wherein the polyalkylene oxide block of formula (I) or formula (II) or both comprises a polyethylene oxide block.

4. The polymeric material of claim 1, wherein the ratio of A to B in the polymeric material is 1:3 to 3:1.

5. The polymeric material of claim 1, wherein a volume fraction for C in the polymeric material is at least about 0.8 to 0.9.

6. The polymeric material of claim 1, wherein a volume fraction for A and B combined in the polymeric material is 0.15 or less.

7. The polymeric material of claim 1, wherein the blend comprises at least one triblock copolymer and at least one pentablock copolymer in a molar ratio from between 95:5 and 1:99 triblock copolymer to pentablock copolymer.

8. A composition comprising a polymeric material of claim 1, the composition selected from the group consisting of hydrated adhesives, coating materials, elastic separation membranes, medical devices, mechanical energy absorbers, battery cell separators, and fuel cell separators.

9. A block copolymer hydrogel, comprising:
a glass formed from a dry blend comprising at least one triblock copolymer and at least one pentablock copolymer; and
a liquid medium at a concentration between about 32:1 and about 2:1 liquid medium/dry blend by weight, wherein the at least one triblock copolymer comprises a triblock copolymer according to formula (I):

A-B-C (I)

wherein,
- A is a polystyrene block;
- B is a polydiene block; and
- C is a polyalkylene oxide block, and wherein the at least one pentablock copolymer comprises a pentablock copolymer according to formula (II):

A-B-C-B-A (II)

wherein,
- A is a polystyrene block;
- B is a polydiene block; and
- C is a polyalkylene oxide block.

10. The block copolymer hydrogel of claim 9, wherein the polydiene block of formula (I), or formula (II), or both comprises a polybutadiene block or a polyisoprene block.

11. The block copolymer hydrogel of claim 10, having a tensile modulus ranging between about 0.01 MPa and about 140 MPa.

12. The block copolymer hydrogel of claim 9, wherein the polyalkylene oxide block of formula (I), or formula (II), or both comprises a polyethylene oxide block.

13. The block copolymer hydrogel of claim 9, wherein the dry blend comprises at least one triblock copolymer and at least one pentablock copolymer in a molar ratio from between 95:5 and 1:99 triblock copolymer to copolymer.

14. The block copolymer hydrogel of claim 9, wherein the at least one triblock copolymer and the at least one pentablock copolymer form a core-shell sphere morphology.

15. The block copolymer hydrogel of claim 9, wherein the at least one triblock copolymer and the at least one pentablock copolymer form a core-shell sphere comprising:
- a spherical core comprising A;
- a shell comprising B; and
- a matrix comprising C.

16. The block copolymer hydrogel of claim 9, having a fatigue resistance to at least 500,000 compression cycles.

17. The block copolymer hydrogel of claim 9, further comprising an active pharmaceutical ingredient.

18. A method for preparing a block copolymer hydrogel, comprising:
- contacting at least one triblock copolymer and at least one pentablock copolymer in a molar ratio from between 95:5 and 1:99 triblock copolymer to pentablock copolymer to form a triblock-pentablock copolymer dry blend;
- heating the dry blend to form a triblock-pentablock copolymer melt;
- allowing the triblock-pentablock copolymer melt to attain ambient temperature to form a triblock-pentablock copolymer glass; and
- contacting the triblock-pentablock copolymer glass with a liquid medium to form a block copolymer hydrogel wherein the at least one triblock copolymer comprises a triblock copolymer according to formula (I):

A-B-C (I)

wherein,
- A is a polystyrene block;
- B is a polydiene block; and
- C is a polyalkylene oxide block, and wherein the at least one pentablock copolymer comprises a pentablock copolymer according to formula (II):

A-B-C-B-A (II)

wherein,
- A is a polystyrene block;
- B is a polydiene block; and
- C is a polyalkylene oxide block.

19. The method of claim 18, wherein the triblock-pentablock copolymer dry blend is formed by dissolving the triblock copolymer and pentablock copolymer in an organic solvent and removing the organic solvent.

20. The method of claim 18, wherein the liquid medium concentration is between about 32:1 and about 4:1 liquid medium/ triblock-pentablock copolymer by weight.

* * * * *